United States Patent
Sato

(10) Patent No.: US 12,411,482 B2
(45) Date of Patent: Sep. 9, 2025

(54) SIGNAL PROCESSING METHOD, SIGNAL PROCESSING DEVICE, AND MONITORING SYSTEM

(71) Applicant: SEIKO EPSON CORPORATION, Tokyo (JP)

(72) Inventor: Kenta Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 456 days.

(21) Appl. No.: 17/891,446

(22) Filed: Aug. 19, 2022

(65) Prior Publication Data

US 2023/0055678 A1 Feb. 23, 2023

(30) Foreign Application Priority Data

Aug. 20, 2021 (JP) ................. 2021-134719

(51) Int. Cl.
G05B 23/00 (2006.01)
H04B 17/26 (2015.01)
H04B 17/309 (2015.01)

(52) U.S. Cl.
CPC .... *G05B 23/00* (2013.01); *G05B 2219/37434* (2013.01); *G05B 2223/02* (2018.08); *G05B 2223/04* (2018.08); *G05B 2223/06* (2018.08); *H04B 17/26* (2015.01); *H04B 17/309* (2015.01)

(58) Field of Classification Search
CPC ............... G05B 23/00; G05B 2223/04; G05B 2223/02; G05B 2223/06; G05B 2219/37434; H04B 17/309; H04B 17/26
See application file for complete search history.

(56) References Cited

FOREIGN PATENT DOCUMENTS

| JP | 2000-258305 A | 9/2000 |
|---|---|---|
| JP | 2013-145122 A | 7/2013 |
| JP | 2017-122635 A | 7/2017 |

OTHER PUBLICATIONS

Lopez et al. (A new methodology for vibration error compensation of optical encoders. Sensors (Basel). 2012;12(4):4918-33. doi: 10.3390/s120404918. Epub Apr. 17, 2012. PMID: 22666067; PMCID: PMC3355449.) (Year: 2012).*

* cited by examiner

*Primary Examiner* — Lisa M Caputo
*Assistant Examiner* — Christian T Bryant
(74) *Attorney, Agent, or Firm* — Harness, Dickey & Pierce, P.L.C.

(57) ABSTRACT

A signal processing method includes: acquiring first measurement data based on a signal output from a first sensor configured to detect a physical quantity of a first axis generated by a vibration of an object and second measurement data based on a signal output from a second sensor configured to detect a physical quantity of a second axis generated by the vibration of the object; generating a Lissajous figure based on the first measurement data and the second measurement data; transforming coordinates of each point in the Lissajous figure into polar coordinates and generating time series data of a first angle which is an angle formed between the first axis and a straight line, the straight line being obtained by projecting a straight line passing through an origin and each point in the Lissajous figure onto a plane including the first axis and the second axis; and executing frequency analysis on the time series data of the first angle and calculating a first maximum peak intensity which is a maximum peak intensity in a first frequency spectrum obtained by the frequency analysis.

10 Claims, 22 Drawing Sheets

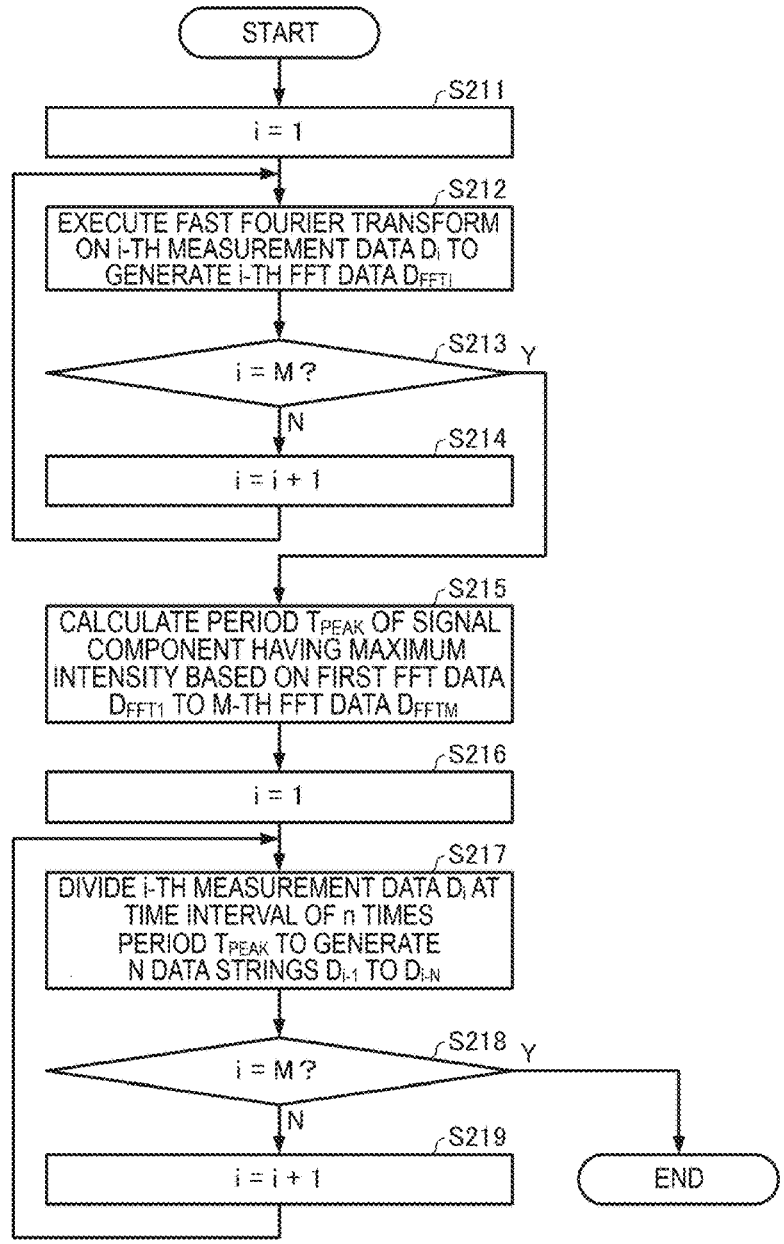
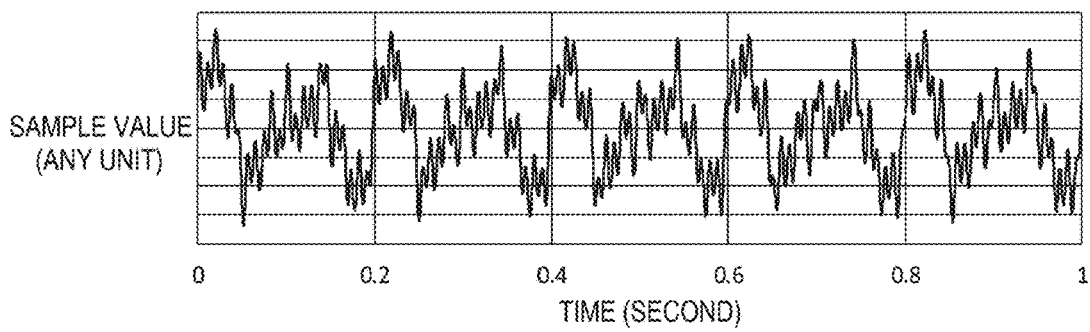

FIG. 26
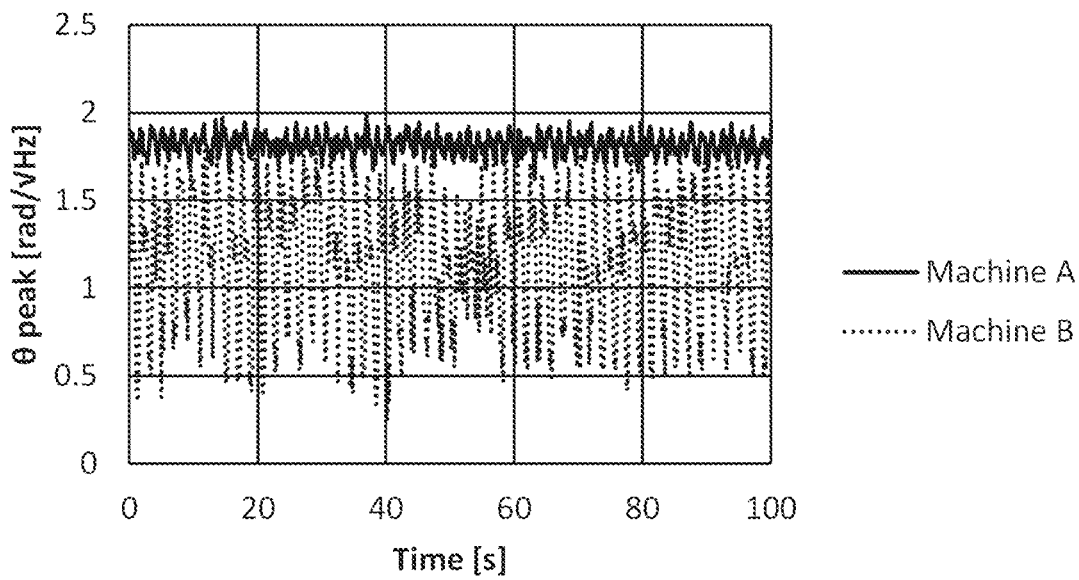
FIG. 27
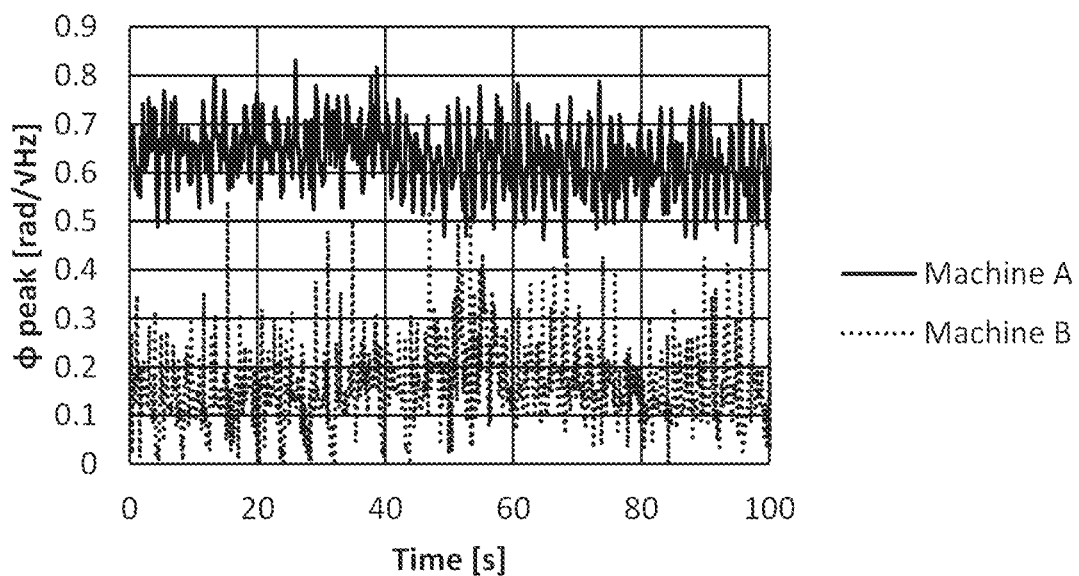
FIG. 28
| item | | Machine A | Machine B |
|---|---|---|---|
| $\theta$ peak | Ave. | 1.82 | 1.16 |
| | Max-Min | 0.36 | 1.61 |
| $\phi$ peak | Ave. | 0.63 | 0.16 |
| | Max-Min | 0.40 | 0.56 |

| STATE OF OBJECT | AVERAGE VALUE OF INDEXES | STANDARD DEVIATION OF INDEXES | INVERSE MATRIX OF CORRELATION MATRIX |
|---|---|---|---|
| NORMAL MODE | $\mu_{(1)1} \sim \mu_{(1)K}$ | $\sigma_{(1)1} \sim \sigma_{(1)K}$ | $R_{(1)}^{-1}$ |
| FIRST FAILURE MODE | $\mu_{(2)1} \sim \mu_{(2)K}$ | $\sigma_{(2)1} \sim \sigma_{(2)K}$ | $R_{(2)}^{-1}$ |
| ⋮ | ⋮ | ⋮ | ⋮ |
| N-TH FAILURE MODE | $\mu_{(N+1)1} \sim \mu_{(N+1)K}$ | $\sigma_{(N+1)1} \sim \sigma_{(N+1)K}$ | $R_{(N+1)}^{-1}$ |

UNIT SPACE INFORMATION

SIGNAL PROCESSING METHOD, SIGNAL PROCESSING DEVICE, AND MONITORING SYSTEM

The present application is based on, and claims priority from JP Application Serial Number 2021-134719, filed Aug. 20, 2021, the disclosure of which is hereby incorporated by reference herein in its entirety.

BACKGROUND

1. Technical Field

The present disclosure relates to a signal processing method, a signal processing device, and a monitoring system.

2. Related Art

JP-A-2000-258305 discloses an abnormality diagnosis device for a bearing portion of a rotary device. The abnormality diagnosis device includes: a vibration detection unit that detects vibrations at predetermined positions on at least two axes orthogonal to each other on the same plane about an axial center of the rotary device and that outputs vibration waveform signals; a Lissajous waveform figure generation unit that generates a Lissajous waveform figure based on the two vibration waveform signals; a reference Lissajous waveform figure setting unit that sets and stores in advance a plurality of reference Lissajous waveform figures assumed based on causes of abnormalities; and an abnormality cause determination unit that compares the Lissajous waveform figure with the reference Lissajous waveform figures and that determines and outputs the causes of the abnormalities.

In the method described in JP-A-2000-258305, it is necessary to set a plurality of reference Lissajous waveform figures assumed based on the causes of the abnormalities, and it is necessary to provide a skilled technique for appropriately setting a threshold value for determining whether the waveforms are similar to each other in order to determine the causes of the abnormalities by comparing the Lissajous waveform figure with the reference Lissajous waveform figures and determining the reference Lissajous waveform figure to which the Lissajous waveform figure is similar. Therefore, in the method described in JP-A-2000-258305, a state of an object such as a rotary device cannot be easily determined.

SUMMARY

An aspect of a signal processing method according to the present disclosure includes: a measurement data acquisition step of acquiring first measurement data based on a signal output from a first sensor configured to detect a physical quantity of a first axis generated by a vibration of an object and second measurement data based on a signal output from a second sensor configured to detect a physical quantity of a second axis generated by the vibration of the object; a Lissajous figure generation step of generating a Lissajous figure based on the first measurement data and the second measurement data; a polar coordinate transformation step of transforming coordinates of each point in the Lissajous figure into polar coordinates and generating time series data of a first angle which is an angle formed between the first axis and a straight line, the straight line being obtained by projecting a straight line passing through an origin and each point in the Lissajous figure onto a plane including the first axis and the second axis; and a first angle maximum peak intensity calculation step of executing frequency analysis on the time series data of the first angle and calculating a first maximum peak intensity which is a maximum peak intensity in a first frequency spectrum obtained by the frequency analysis.

An aspect of a signal processing device according to the present disclosure includes: a measurement data acquisition circuit configured to acquire first measurement data based on a signal output from a first sensor configured to detect a physical quantity of a first axis generated by a vibration of an object and second measurement data based on a signal output from a second sensor configured to detect a physical quantity of a second axis generated by the vibration of the object; a Lissajous figure generation circuit configured to generate a Lissajous figure based on the first measurement data and the second measurement data; a polar coordinate transformation circuit configured to transform coordinates of each point in the Lissajous figure into polar coordinates, and generate time series data of a first angle which is an angle formed between the first axis and a straight line, the straight line being obtained by projecting a straight line passing through an origin and each point in the Lissajous figure onto a plane including the first axis and the second axis; and a first angle maximum peak intensity calculation circuit configured to execute frequency analysis on the time series data of the first angle and calculate a first maximum peak intensity which is a maximum peak intensity in a first frequency spectrum obtained by the frequency analysis.

An aspect of a monitoring system according to the present disclosure is a monitoring system configured to monitor a state of an object. The monitoring system includes an aspect of the signal processing device, the first sensor, and the second sensor. The object includes a movable body and a housing configured to house the movable body. The first sensor and the second sensor are attached to the housing.

BRIEF DESCRIPTION OF THE DRAWINGS

FIG. 3 is a flowchart showing an example of a detailed procedure of step S21 in FIG. 2.

FIG. 4 is a diagram showing an example of i-th measurement data.

FIG. 26 is a diagram showing an example of time series data of a maximum peak intensity of an actually measured angle θ.

FIG. 27 is a diagram showing an example of time series data of a maximum peak intensity of an actually measured angle φ.

FIG. 28 is a diagram showing an example of average values and variations of the maximum peak intensities of the angles θ and φ.

DESCRIPTION OF EXEMPLARY EMBODIMENTS

Hereinafter, preferred embodiments of the present disclosure will be described in detail with reference to the drawings. The embodiments described below do not unduly limit the scope of the present disclosure described in the claims. In addition, all of the configurations described below are not necessarily essential constituent elements of the present disclosure.

Figure 1:
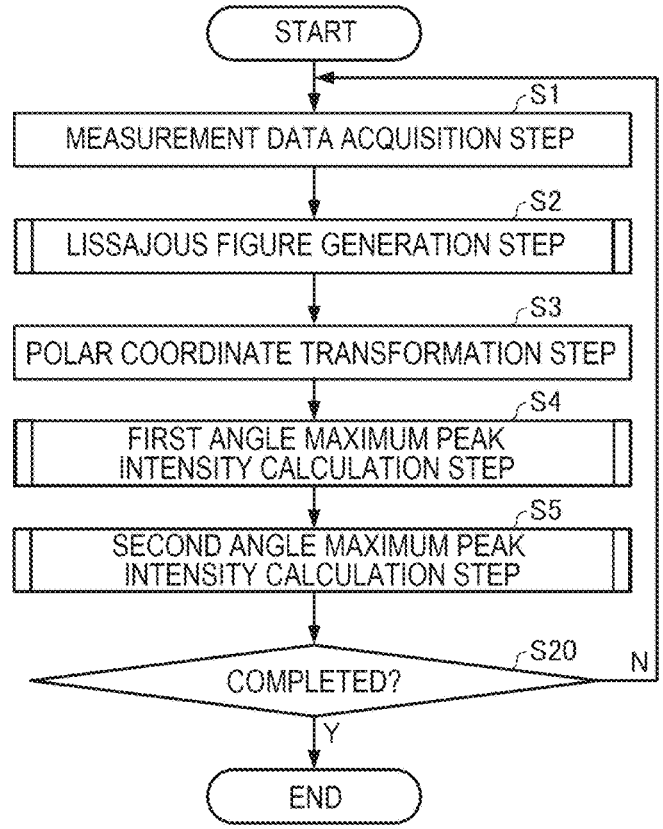
FIG. 1 is a flowchart showing a procedure of a signal processing method according to a first embodiment.

1. Signal Processing Method and Signal Processing Device 1-1. First Embodiment 1-1-1. Signal Processing Method FIG. 1 is a flowchart showing a procedure of a signal processing method according to a first embodiment. As shown in FIG. 1, the signal processing method according to the first embodiment includes a measurement data acquisition step S1, a Lissajous figure generation step S2, a polar coordinate transformation step S3, a first angle maximum peak intensity calculation step S4, and a second angle maximum peak intensity calculation step S5. In the signal processing method according to the first embodiment, a part of the steps may be omitted or changed, or other steps may be added. The signal processing method according to the first embodiment is executed by, for example, a signal processing device 100. A configuration example of the signal processing device 100 that executes the signal processing method according to the first embodiment will be described later.

As shown in FIG. 1, first, in the measurement data acquisition step S1, the signal processing device 100 acquires i-th measurement data $D_i$ for each integer i of 1 or more and M or less. M is a predetermined integer of 2 or more. The i-th measurement data $D_i$ is data based on a signal output from an i-th sensor that detects a physical quantity of an i-th axis generated by a vibration of an object. The i-th measurement data $D_i$ may be time series data of a digital signal output from the i-th sensor or time series data of a digital signal obtained by transforming an analog signal output from the i-th sensor by an analog front end. In the measurement data acquisition step S1, the signal processing device 100 acquires at least first measurement data $D_1$ and second measurement data $D_2$. For example, in the measurement data acquisition step S1, the signal processing device 100 may acquire the first measurement data $D_1$, the second measurement data $D_2$, and third measurement data $D_3$. It is preferable that a first axis, a second axis, and a third axis are three axes intersecting with one another and are three axes orthogonal to one another.

The object is an object to be subjected to signal processing, and a type of the object is not particularly limited. For example, the object may be various devices including a rotation mechanism or a vibration mechanism, such as an electric motor or a motor, may be a structure that vibrates by an external force, such as a bridge or a building, or may be an electric circuit that generates a signal having periodicity. A type of the physical quantity generated by the vibration of the object is not particularly limited. For example, the physical quantity may be acceleration, angular velocity, velocity, displacement, pressure, current, or voltage.

First to M-th sensors may be sensors that detect the same type of physical quantity. For example, the first sensor may detect the acceleration in an X-axis direction, the second sensor may detect the acceleration in a Y-axis direction, and the third sensor may detect the acceleration in a Z-axis direction, with an X axis, a Y axis, and a Z axis that are orthogonal to one another as a first axis, a second axis, and a third axis, respectively. Alternatively, a part of the first to M-th sensors may be sensors that detect different types of physical quantities from the other sensors. For example, the first sensor may detect the acceleration in the X-axis direction, the second sensor may detect the acceleration in the Y-axis direction, and the third sensor may detect the angular velocity in the Z-axis direction. In addition, the first to M-th sensors may be, for example, sensors using a MEMS oscillator or sensors using a crystal oscillator. MEMS is an abbreviation for micro electro mechanical systems. For example, the first to M-th sensors may be built in one device such as an IMU, or at least one of the first to M-th sensors may be physically separated from another sensor. IMU is an abbreviation for inertial measurement unit.

Next, in the Lissajous figure generation step S2, the signal processing device 100 generates a Lissajous figure based on the first measurement data $D_1$ to M-th measurement data $D_M$ that are acquired in the measurement data acquisition step S1. In the Lissajous figure generation step S2, the signal processing device 100 generates a Lissajous figure based on at least the first measurement data $D_1$ and the second measurement data $D_2$. For example, in the Lissajous figure generation step S2, the signal processing device 100 may generate a Lissajous figure based on the first measurement data $D_1$, the second measurement data $D_2$, and the third measurement data $D_3$.

Figure 2:
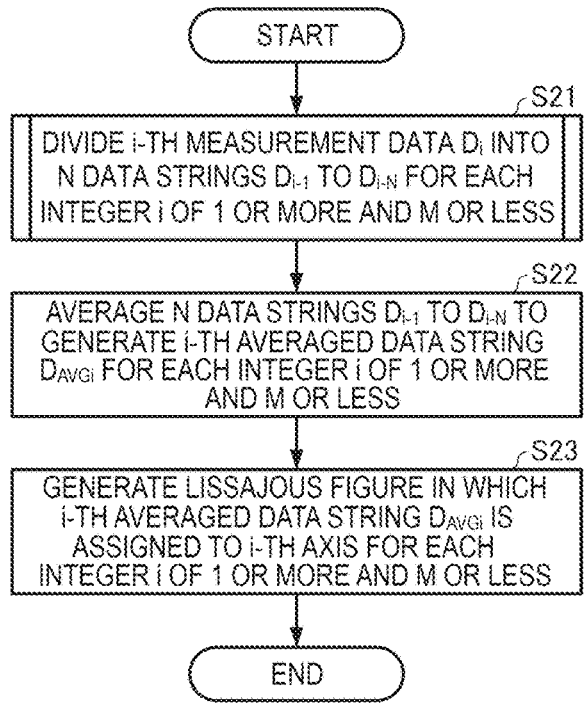
FIG. 2 is a flowchart showing an example of a procedure of a Lissajous figure generation step.

FIG. 2 is a flowchart showing an example of a procedure of the Lissajous figure generation step S2.

As shown in FIG. 2, first, in step S21, the signal processing device 100 divides, for each integer i of 1 or more and M or less, the i-th measurement data $D_i$ acquired in the measurement data acquisition step S1 in FIG. 1 is divided into N data strings $D_{i-1}$ to $D_{i-N}$. N is a predetermined integer of 2 or more. That is, in step S21, the signal processing device 100 generates N data strings for each of the first measurement data $D_1$ to the M-th measurement data $D_M$.

Next, in step S22, the signal processing device 100 generates, for each integer i of 1 or more and M or less, an i-th averaged data string $D_{AVGi}$ obtained by averaging the N data strings $D_{i-1}$ to $D_{i-N}$ that are generated by dividing the i-th measurement data $D_i$ in step S21. Specifically, in step S22, the signal processing device 100 generates, for each integer i of 1 or more and M or less, the i-th averaged data string $D_{AVGi}$ by transforming, for each of the N data strings $D_{i-1}$ to $D_{i-N}$, a time of each data with the time of the previous data as a common time, and averaging N pieces of data at the same time.

Next, in step S23, the signal processing device 100 generates, for each integer i of 1 or more and M or less, a Lissajous figure in which the i-th averaged data string $D_{AVGi}$ generated in step S22 is assigned to the i-th axis.

FIG. 3 is a flowchart showing an example of a detailed procedure of step S21 in FIG. 2.

As shown in FIG. 3, first, in step S211, the signal processing device 100 sets the integer i to 1, and in step S212, executes fast Fourier transform on the i-th measurement data $D_i$ acquired in the measurement data acquisition step S1 in FIG. 1 to generate i-th FFT data $D_{FFTi}$. FFT is an abbreviation for fast Fourier transform.

Figure 5:
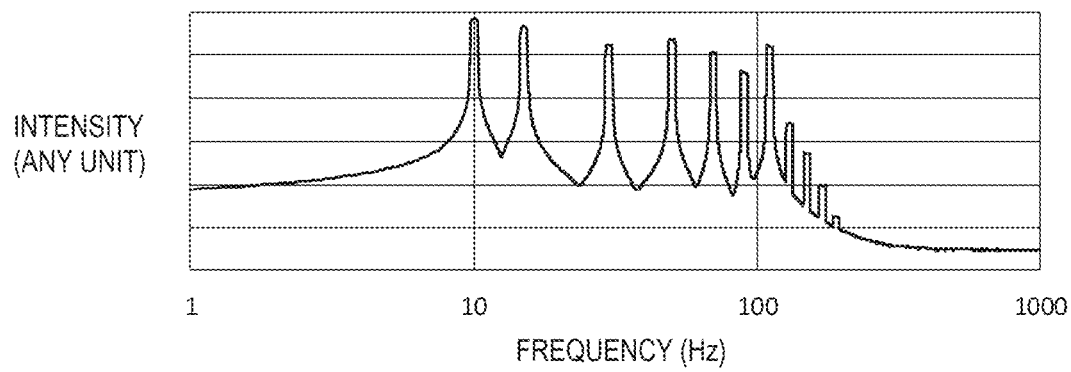
FIG. 5 is a diagram showing i-th FFT data.

FIG. 4 shows an example of the i-th measurement data $D_i$, and FIG. 5 shows the i-th FFT data $D_{FFTi}$ generated by executing fast Fourier transform on the measurement data $D_i$ in FIG. 4. In FIG. 4, the horizontal axis represents times, and the vertical axis represents sample values. In FIG. 5, the horizontal axis represents frequencies, and the vertical axis represents intensities. In the example in FIG. 4, the i-th measurement data $D_i$ is data for one second, and as shown in FIG. 5, the i-th measurement data $D_i$ includes a signal component of 10 Hz as a fundamental wave based on the vibration of the object.

Then, the signal processing device 100 repeats step S212 by increasing the integer i by 1 in step S214 until the integer i is M in step S213. That is, in steps S212 to S214, the signal processing device 100 executes fast Fourier transform on the first measurement data $D_1$ to the M-th measurement data $D_M$ to generate first FFT data $D_{FFT1}$ to M-th FFT data $D_{FFTM}$.

Next, when the integer i is M in step S213, in step S215, the signal processing device 100 calculates, based on the first FFT data $D_{FFT1}$ to the M-th FFT data $D_{FFTM}$, a period $T_{peak}$ of a signal component having a maximum intensity. For example, in step S215, the signal processing device 100 may calculate, for each frequency, the period $T_{peak}$ by adding peak values of the intensities included in the first FFT data $D_{FFT1}$ to the M-th FFT data $D_{FFT}M$ and calculating a reciprocal of the frequency at which the peak value after the addition is maximum.

Next, in step S216, the signal processing device 100 sets the integer i to 1, and in step S217, divides the i-th measurement data $D_i$ acquired in the measurement data acquisition step S1 in FIG. 1 at a time interval of n times the period $T_{peak}$ calculated in step S215 to generate the N data strings $D_{i-1}$ to $D_{i-N}$. n is an integer of 1 or more. That is, in step S217, the signal processing device 100 divides the i-th measurement data $D_i$ and generates the N data strings $D_{i-1}$ to $D_{i-N}$ each having a time length of n times the period $T_{peak}$. The time length of the i-th measurement data $D_i$ may be longer than n×N times the period $T_{peak}$.

Figure 6:
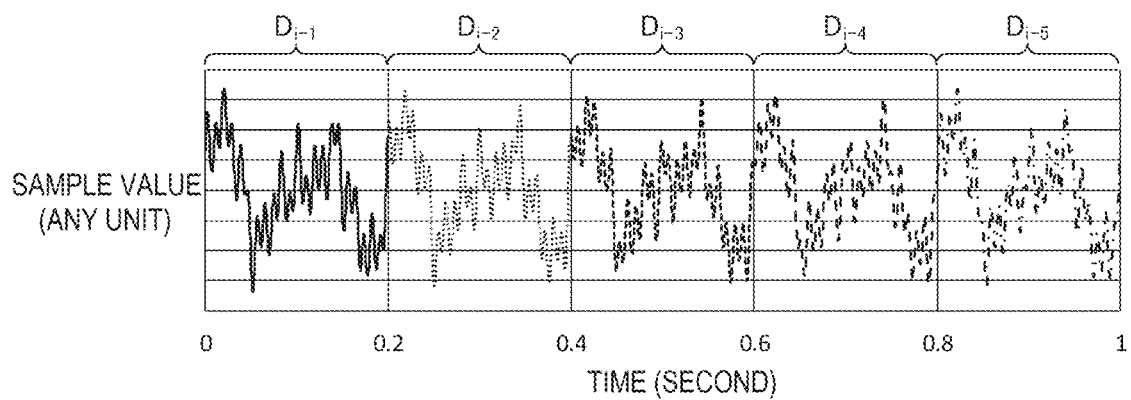
FIG. 6 is a diagram showing five data strings generated by dividing the i-th measurement data.

FIG. 6 shows five data strings $D_{i-1}$ to $D_{i-5}$ generated by dividing the i-th measurement data $D_i$ in FIG. 4. In FIG. 6, the horizontal axis represents times, and the vertical axis represents sample values. Assuming that in FIG. 4, the intensity of the signal component of the fundamental wave of 10 Hz is the maximum and the period $T_{peak}$ is 0.1 seconds, in FIG. 6, the integer n is 2, the i-th measurement data $D_i$ is divided at an interval of 0.2 seconds, and five data strings $D_{i-1}$ to $D_{i-5}$ are generated.

Then, the signal processing device 100 repeats step S217 by increasing the integer i by 1 in step S219 until the integer i is M in step S218, and ends step S21 when the integer i is M in step S218. That is, in steps S217 to S219, the signal processing device 100 generates the N data strings $D_{i-1}$ to $D_{i-N}$ for each of the first measurement data $D_1$ to the M-th measurement data $D_M$.

The signal processing device 100 averages the N data strings $D_{i-1}$ to $D_{i-N}$ thus generated for each integer i of 1 or more and M or less to generate the i-th averaged data string $D_{AVGi}$.

Figure 7:
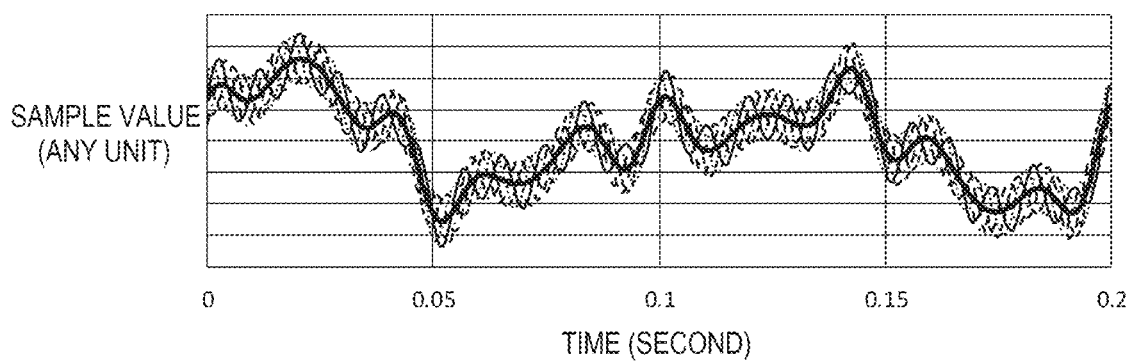
FIG. 7 is a diagram showing an i-th averaged data string obtained by averaging the five data strings shown in FIG. 6.

In FIG. 7, the i-th averaged data string $D_{AVGi}$ obtained by averaging the data strings $D_{i-1}$ to $D_{i-5}$ in FIG. 6 is indicated by a thick solid line. In FIG. 6, the horizontal axis represents times, and the vertical axis represents sample values. In FIG. 7, the data strings $D_{i-1}$ to $D_{i-5}$ are also shown. A sample value at a time t of the i-th averaged data string $D_{AVGi}$ is an average value of a sample value at the time t of the data string $D_{i-1}$, a sample value at a time t+0.2 second of the data string $D_{i-2}$, a sample value at a time t+0.4 second of the data string $D_{i-3}$, a sample value at a time t+0.6 second of the data string $D_{i-4}$, and a sample value at a time t+0.8 second of the data string $D_{i-5}$.

Then, the signal processing device 100 generates, for each integer i of 1 or more and M or less, a Lissajous figure in which the i-th averaged data string $D_{AVGi}$ is assigned to the i-th axis. The signal component based on the vibration of the object included in the i-th measurement data $D_i$ is also included in the i-th averaged data string $D_{AVGi}$, and a noise component included in the i-th measurement data $D_i$ is greatly reduced by averaging. Therefore, by the procedure of steps S211 to S219 in FIG. 3, a stable Lissajous figure with reduced fluctuation can be obtained.

Referring back to FIG. 1, next, in the polar coordinate transformation step S3, the signal processing device 100 transforms the coordinates of each point in the Lissajous figure generated in the Lissajous figure generation step S2 into polar coordinates, and generates time series data of a first angle which is an angle between the second axis and a straight line. The straight line is obtained by projecting a straight line passing through the origin and each point in the Lissajous figure onto a plane including the first axis and the second axis. In addition, in the polar coordinate transformation step S3, when the integer M is 3 or more, the signal processing device 100 may generate time series data of a second angle which is an angle formed by the third axis and the straight line passing through the origin and each point in the Lissajous figure. For example, when the Lissajous figure as shown in FIG. 8 is obtained in the Lissajous figure generation step S2 with the first axis as the X axis, the second axis as the Y axis, and the third axis as the Z axis, the signal processing device 100 transforms the coordinates of each point in the Lissajous figure into polar coordinates (r, θ, φ). r represents a distance between each point in the Lissajous figure and an origin of an XYZ space. θ represents a first angle between the Y axis and a straight line obtained by projecting the straight line passing through the origin and each point in the Lissajous figure onto an XY plane including the X axis and the Y axis, and corresponds to the first angle. φ represents an angle between the Z axis and the straight line passing through the origin and each point in the Lissajous figure, and corresponds to the second angle.

Figure 8:
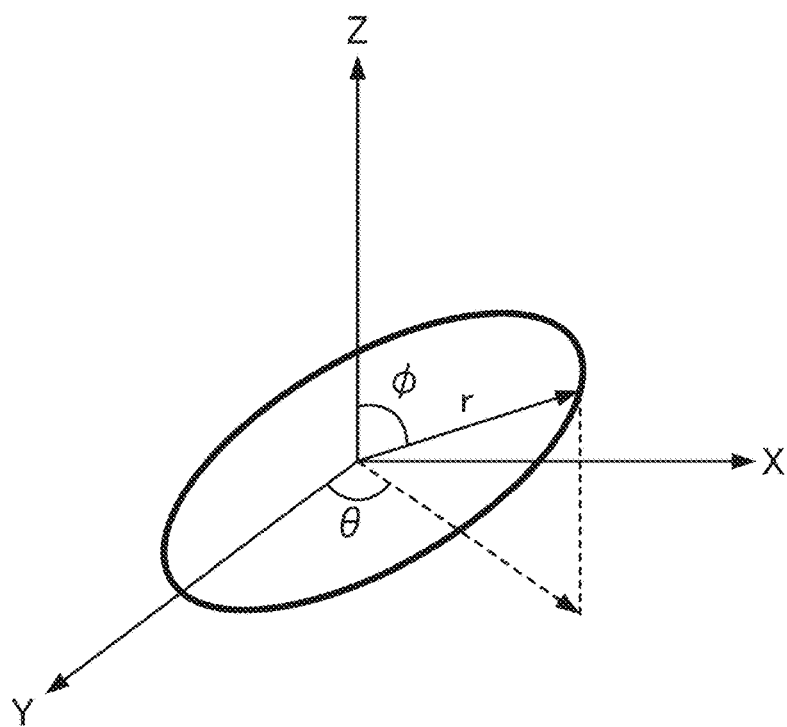
FIG. 8 is a diagram showing an example of a Lissajous figure.
Figure 9:
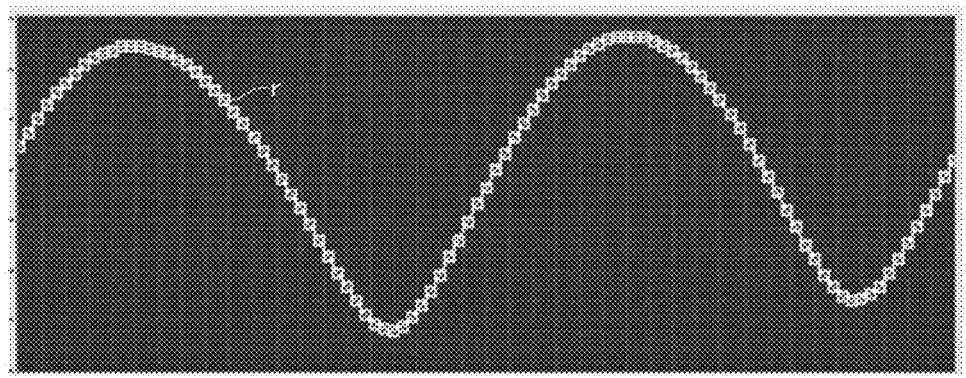
FIG. 9 is a diagram showing an example of time series data of a distance r.
Figure 10:
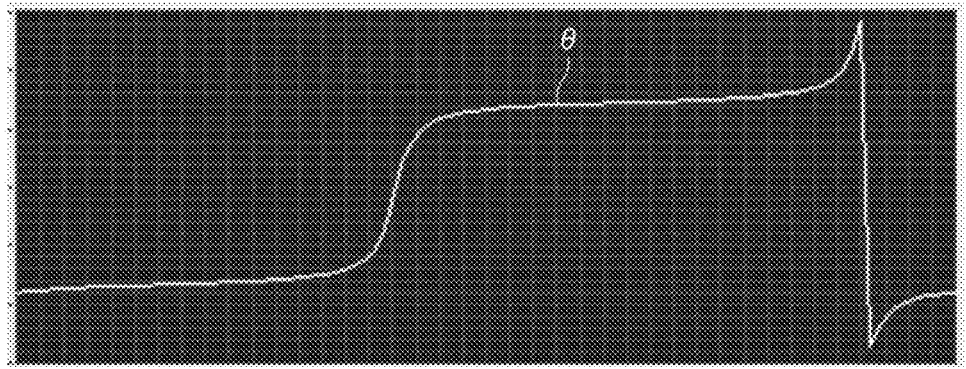
FIG. 10 is a diagram showing an example of time series data of an angle θ.
Figure 11:
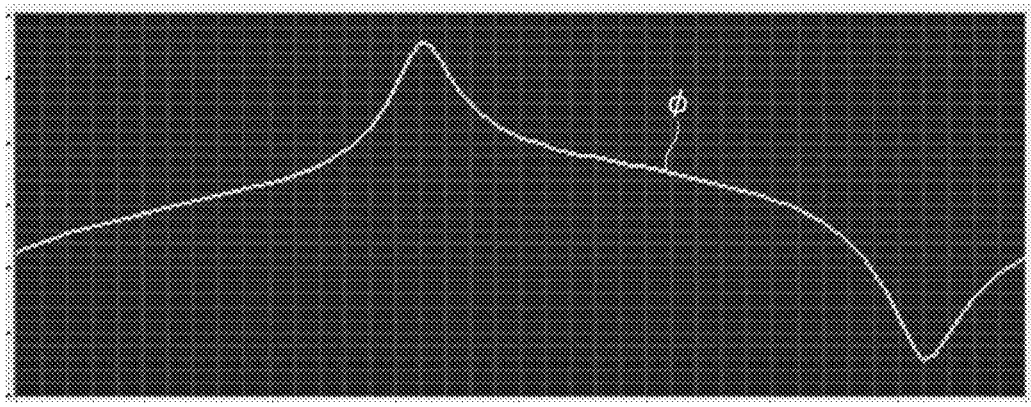
FIG. 11 is a diagram showing an example of time series data of an angle φ.

FIGS. 9, 10, and 11 show time series data of r, θ, and φ obtained by transforming the coordinates of each point in the Lissajous figure shown in FIG. 8 into polar coordinates, respectively. In FIGS. 9, 10, and 11, the horizontal axis represents time.

When the integer M is 2, the Lissajous figure generated in the Lissajous figure generation step S2 is drawn on the XY plane including the X axis which is the first axis and the Y axis which is the second axis. Therefore, the signal processing device 100 transforms the coordinates of each point in the Lissajous figure into polar coordinates (r, θ). In this case, since the straight line passing through the origin and each point in the Lissajous figure can also be said to be a straight line obtained by projecting the straight line passing through each point and the origin onto the XY plane, θ corresponds to the first angle.

Figure 12:
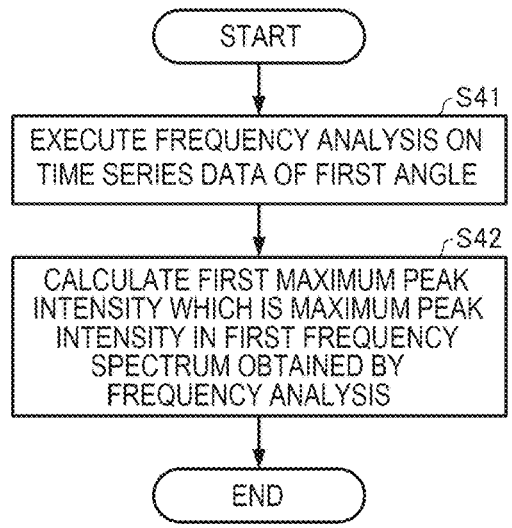
FIG. 12 is a flowchart showing an example of a procedure of a first angle maximum peak intensity calculation step.

Referring back to FIG. 1, next, the signal processing device 100 executes the first angle maximum peak intensity calculation step S4. FIG. 12 is a flowchart showing an example of a procedure of the first angle maximum peak intensity calculation step S4. As shown in FIG. 12, first, in step S41, the signal processing device 100 executes frequency analysis on the time series data of the first angle generated in the polar coordinate transformation step S3 in FIG. 1. Then, in step S42, the signal processing device 100 calculates a first maximum peak intensity which is a maximum peak intensity in a first frequency spectrum obtained by the frequency analysis in step S41.

As described above, in the first angle maximum peak intensity calculation step S4 in FIG. 1, the signal processing device 100 executes frequency analysis on the time series data of the first angle, and calculates the first maximum peak intensity which is the maximum peak intensity in the first frequency spectrum obtained by the frequency analysis. For example, in the first angle maximum peak intensity calculation step S4, the signal processing device 100 may execute fast Fourier transform on the time series data of the angle θ corresponding to the first angle to generate the first frequency spectrum, and calculate, as the first maximum peak intensity, a value of a peak having the highest intensity among one or a plurality of peaks in the first frequency spectrum.

Figure 13:
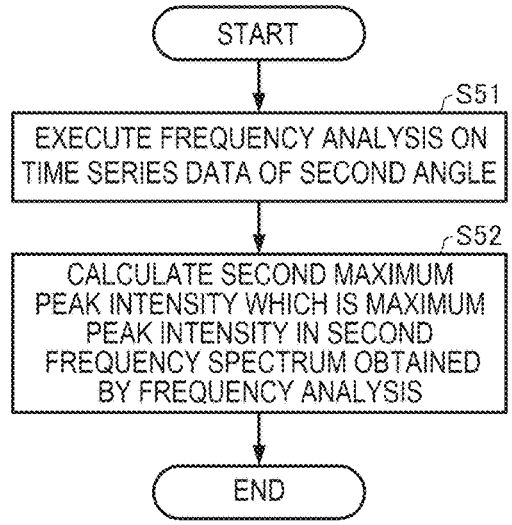
FIG. 13 is a flowchart showing an example of a procedure of a second angle maximum peak intensity calculation step.

Next, when the integer M is 3 or more, the signal processing device 100 executes the second angle maximum peak intensity calculation step S5. FIG. 13 is a flowchart showing an example of a procedure of the second angle maximum peak intensity calculation step S5. As shown in FIG. 13, first, in step S51, the signal processing device 100 executes frequency analysis on the time series data of the second angle generated in the polar coordinate transformation step S3 in FIG. 1. Then, in step S52, the signal processing device 100 calculates a second maximum peak intensity which is the maximum peak intensity in a second frequency spectrum obtained by the frequency analysis in step S51.

As described above, in the second angle maximum peak intensity calculation step S5 in FIG. 1, the signal processing device 100 executes frequency analysis on the time series data of the second angle, and calculates the second maximum peak intensity which is the maximum peak intensity in the second frequency spectrum obtained by the frequency analysis. For example, the signal processing device 100 may execute fast Fourier transform on the time series data of the angle φ corresponding to the second angle to generate the second frequency spectrum, and calculate, as the second maximum peak intensity, a value of a peak having the highest intensity among one or a plurality of peaks in the second frequency spectrum.

Then, until the signal processing is completed (N in step S20), the signal processing device 100 repeats steps S1 to S5.

The procedure in FIG. 1 may also be added with a display step in which the signal processing device 100 displays the Lissajous figure generated in the Lissajous figure generation step S2 on a display unit (not shown). In the display step, the signal processing device 100 may display, on the display unit (not shown), the N data strings $D_{i-1}$ to $D_{i-N}$ generated in step S21 in FIG. 2 and the Lissajous figure generated in step S23 in FIG. 2.

1-1-2. Actual Measurement Results

Hereinafter, actual measurement results obtained by fixing a triaxial acceleration sensor to each of an electric motor A and an electric motor B, which are objects, and executing the procedures of the above signal processing method will be described. The triaxial acceleration sensor includes a first sensor that detects the acceleration in the X axis which is the first axis, a second sensor that detects the acceleration in the Y axis which is the second axis, and a third sensor that detects the acceleration in the Z axis which is the third axis. The electric motor A and the electric motor B are the same type of electric motor, and operating time of the electric motor B is longer than operating time of the electric motor A.

Figure 14:
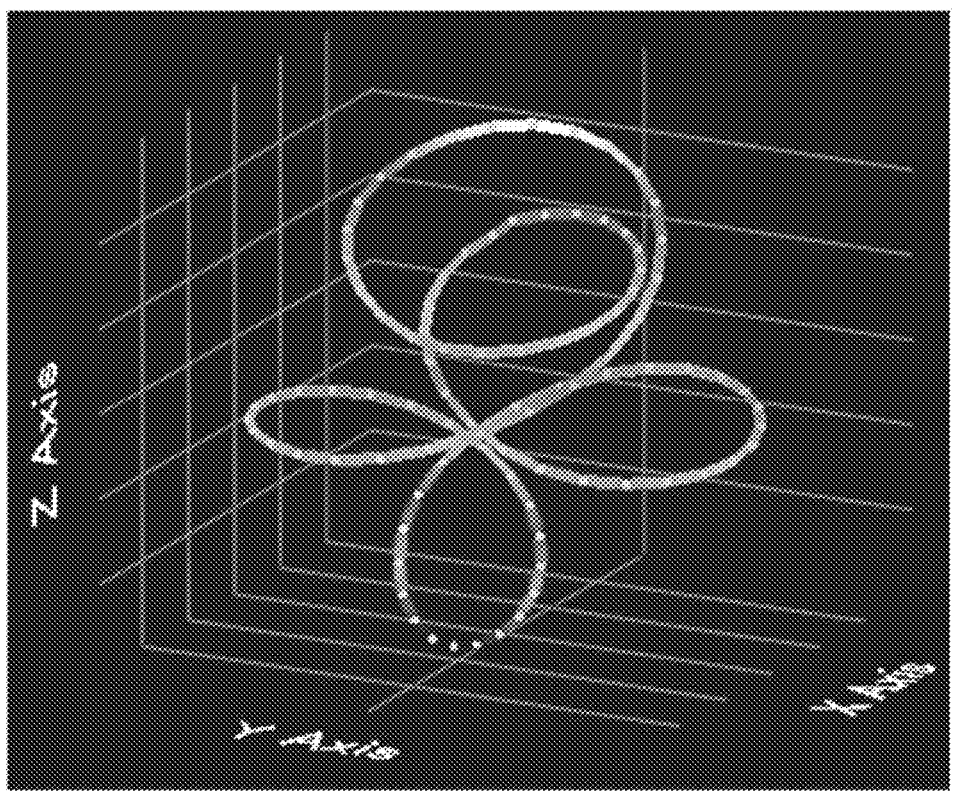
FIG. 14 is a diagram showing an example of an actually measured Lissajous figure.
Figure 15:
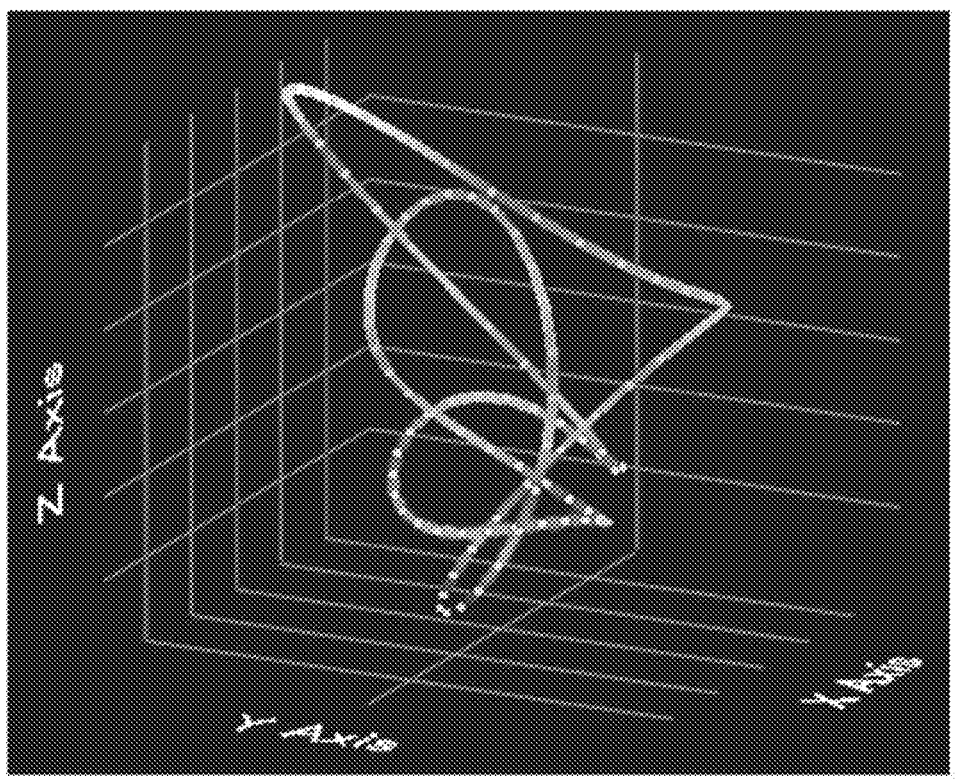
FIG. 15 is a diagram showing another example of the actually measured Lissajous figure.

FIG. 14 shows an example of a Lissajous figure obtained in a state in which the triaxial acceleration sensor is fixed to the electric motor A and the electric motor A is operated. FIG. 15 shows an example of a Lissajous figure obtained in a state in which the triaxial acceleration sensor is fixed to the electric motor B and the electric motor B is operated.

In the Lissajous figure in FIG. 14 corresponding to the vibration of the electric motor A, four elliptic circles and one relatively large elliptic circle that are arranged symmetrically by 90 degrees are seen. On the other hand, in the Lissajous figure in FIG. 15 corresponding to the vibration of the electric motor B, four circles can be confirmed, and as compared with the Lissajous figure in FIG. 14, elliptic shapes of the circles are deformed, sizes thereof are varied, and a symmetry of appearance positions is low. It can be said that the electric motor A whose operating time is shorter than that of the electric motor B is in a vibration state with high symmetry, and it is estimated that a difference between the two Lissajous figures is caused by a difference in the operating time.

Figure 16:
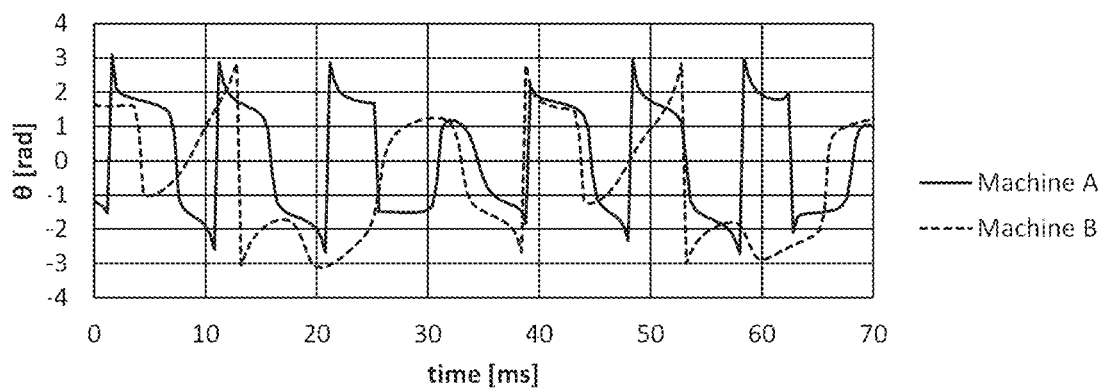
FIG. 16 is a diagram showing an example of time series data of an actually measured angle θ.

FIG. 16 is a diagram showing the time series data of θ, which is the first angle, obtained by transforming each point in the Lissajous figures in FIGS. 14 and 15 into polar coordinates. In FIG. 16, the horizontal axis represents time. The solid line indicates the time series data of θ obtained by transforming each point in the Lissajous figure in FIG. 14 corresponding to the vibration of the electric motor A into polar coordinates. The broken line indicates the time series data of θ obtained by transforming each point in the Lissajous figure in FIG. 15 corresponding to the vibration of the electric motor B into polar coordinates.

Figure 17:
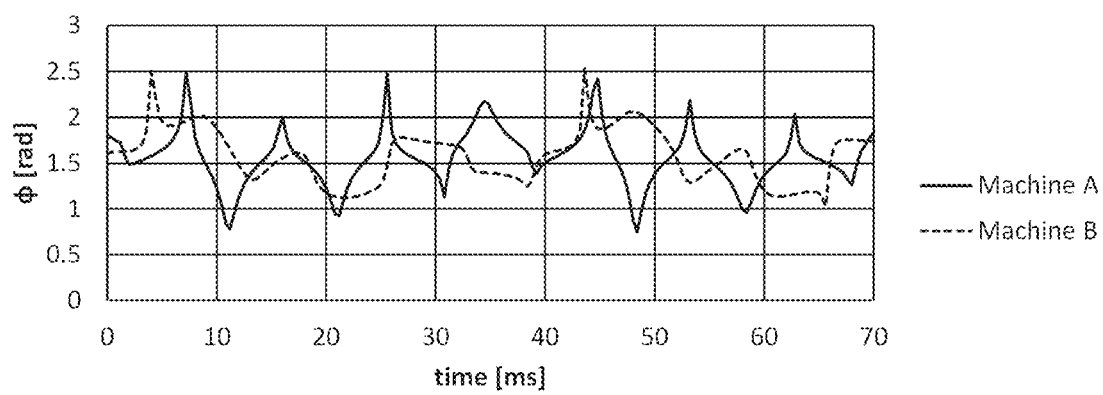
FIG. 17 is a diagram showing an example of time series data of an actually measured angle φ.

FIG. 17 is a diagram showing an example of the time series data of φ, which is the second angle, obtained by transforming each point in the Lissajous figures shown in FIGS. 14 and 15 into polar coordinates. In FIG. 17, the horizontal axis represents time. The solid line indicates the time series data of φ obtained by transforming each point in the Lissajous figure in FIG. 14 corresponding to the vibration of the electric motor A into polar coordinates. The broken line indicates the time series data of φ obtained by transforming each point in the Lissajous figure in FIG. 15 corresponding to the vibration of the electric motor B into polar coordinates.

θ and φ corresponding to the vibration of the electric motor A indicated by the solid lines in FIGS. 16 and 17 are changes corresponding to an elliptic movement with a constant period. On the other hand, it is understood that θ and φ corresponding to the vibration of the electric motor B indicated by the broken lines in FIGS. 16 and 17 are not stable in period and are rotational movements that cannot be expressed by a simple elliptic movement. Since the vibrations of the electric motor A and the electric motor B are constituted by a continuous three-dimensional rotational movement, the difference in the stability of the vibrations remarkably appears in θ and φ in polar coordinate display.

Figure 18:
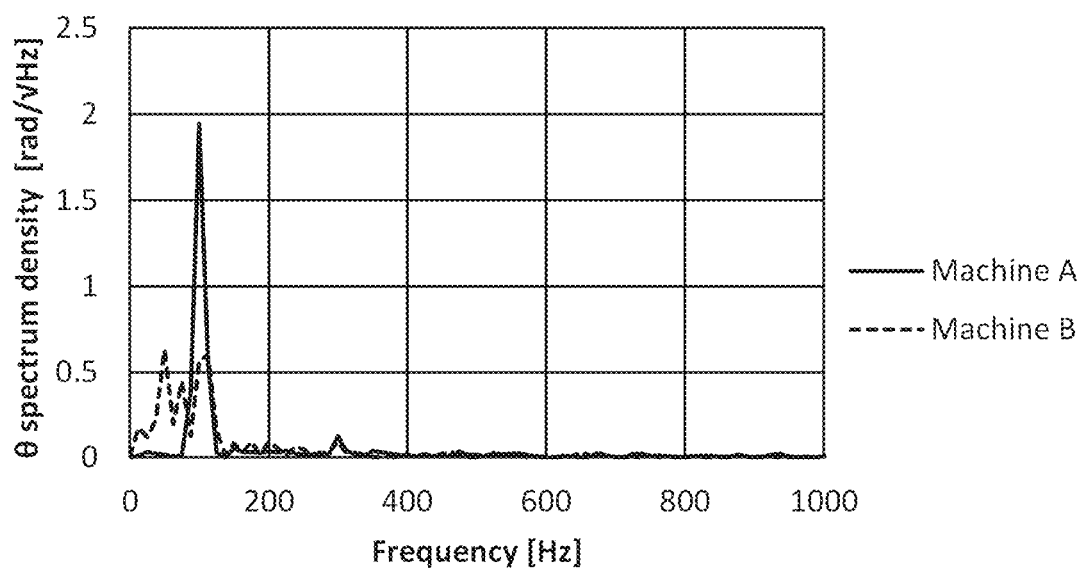
FIG. 18 is a diagram showing an example of a frequency spectrum of the time series data of the angle θ.

FIG. 18 is a diagram showing a frequency spectrum obtained by executing fast Fourier transform on each of the time series data of θ corresponding to the vibration of the electric motor A and the time series data of θ corresponding to the vibration of the electric motor B that are shown in FIG. 16. In FIG. 18, the horizontal axis represents frequencies, and the vertical axis represents intensities. The solid line indicates the frequency spectrum of θ corresponding to the vibration of the electric motor A indicated by the solid line in FIG. 16. The broken line indicates the frequency spectrum of θ corresponding to the vibration of the electric motor B indicated by the broken line in FIG. 16.

Figure 19:
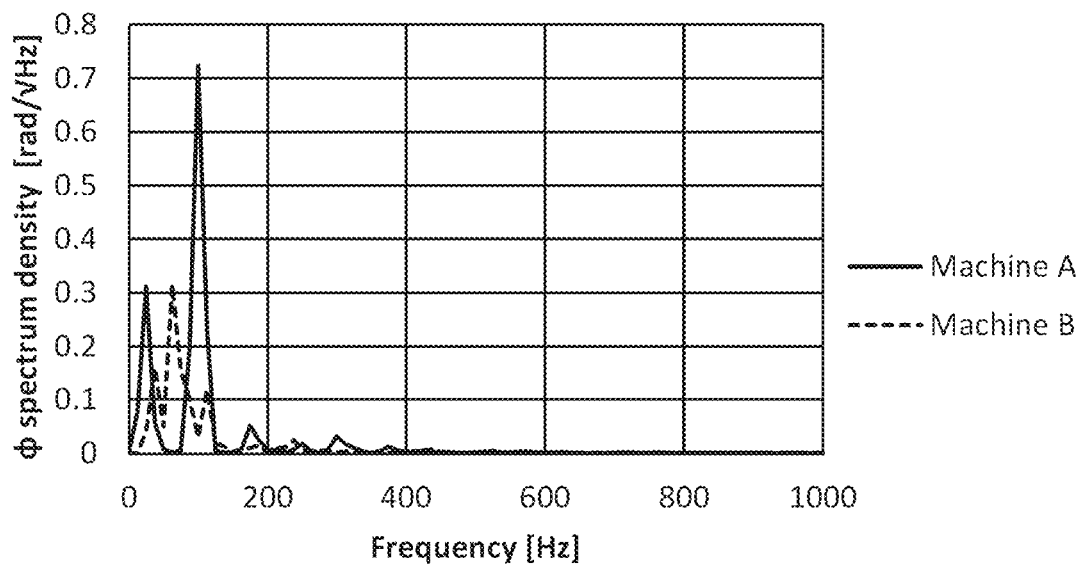
FIG. 19 is a diagram showing an example of a frequency spectrum of the time series data of the angle φ.

FIG. 19 is a diagram showing a frequency spectrum obtained by executing fast Fourier transform on each of the time series data of φ corresponding to the vibration of the electric motor A and the time series data of φ corresponding to the vibration of the electric motor B that are shown in FIG. 17. In FIG. 19, the horizontal axis represents frequencies, and the vertical axis represents intensities. The solid line indicates the frequency spectrum of φ corresponding to the vibration of the electric motor A indicated by the solid line in FIG. 17. The broken line indicates the frequency spectrum of φ corresponding to the vibration of the electric motor B indicated by the broken line in FIG. 17.

In FIGS. 18 and 19, in the frequency spectra of θ and φ corresponding to the vibration of the electric motor A indicated by the solid line, a single peak having a large intensity is confirmed in the vicinity of 100 Hz, and in the frequency spectra of θ and φ corresponding to the vibration of the electric motor B indicated by the broken line, a plurality of peaks having a small difference in intensity are confirmed. In FIG. 18, the maximum peak intensity of θ corresponding to the vibration of the electric motor A is about 2 rad/1 Hz, whereas the maximum peak intensity of θ corresponding to the vibration of the electric motor B is about 0.6 rad/1 Hz, which is a significant difference between the two maximum peak intensities. Similarly, in FIG. 19, the maximum peak intensity of φ corresponding to the vibration of the electric motor A is about 0.7 rad/1 Hz, whereas the maximum peak intensity of φ corresponding to the vibration of the electric motor B is about 0.3 rad/1 Hz, which is a significant difference between the two maximum peak intensities. As described above, the maximum peak intensities of θ and φ are correlated with the symmetry and smoothness of the rotational movement of the Lissajous figure, and are effective as an index indicating the state of the object. For example, a user or the signal processing device 100 can determine whether the operation of the object is normal or abnormal based on a result of comparing the maximum peak intensity of C with a first threshold value and a result of comparing the maximum peak intensity of φ with a second threshold value. In addition, since θ and φ, which are dimensionless values, are unchanged even when a magnitude of the vibration of the object changes, there is also an advantage that the maximum peak intensity of θ is also unchanged, and the first threshold value and the second threshold value can be constant regardless of characteristics and an installation place of the object.

1-1-3. Signal Processing Device

Figure 20:
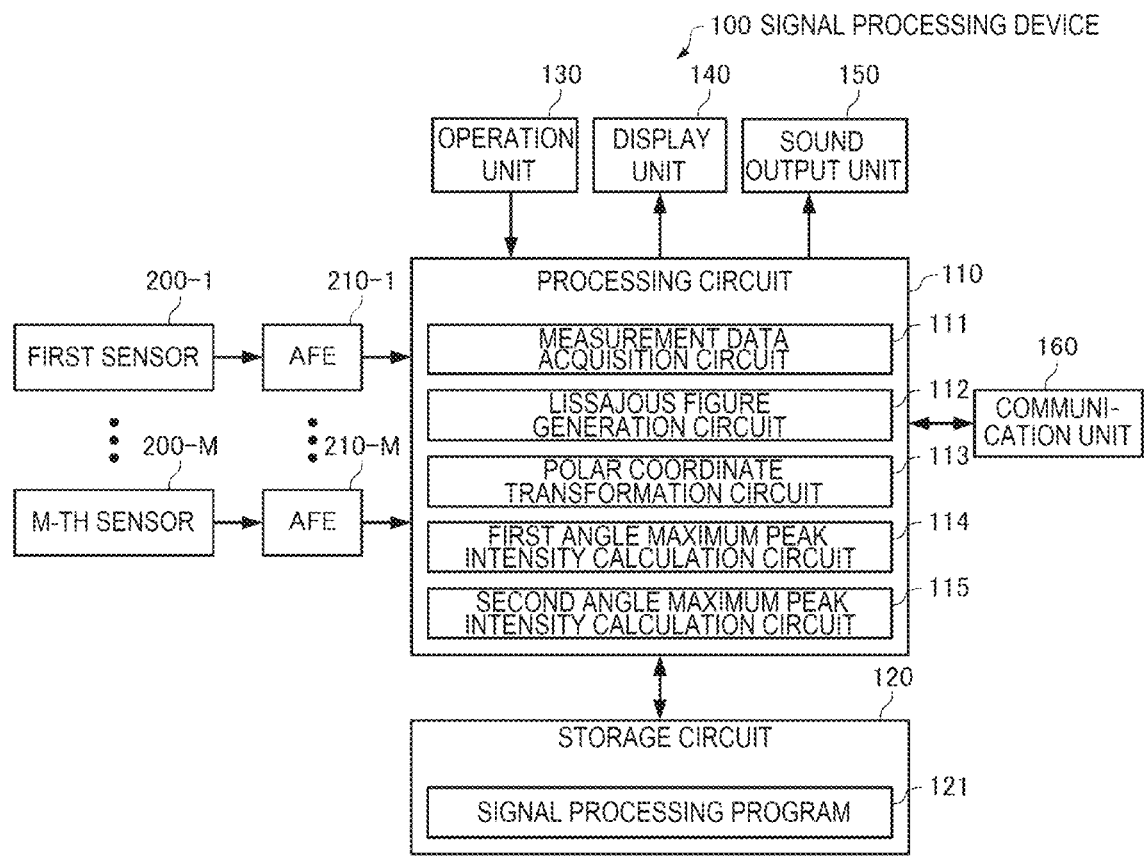
FIG. 20 is a diagram showing a configuration example of a signal processing device that executes the signal processing method according to the first embodiment.

FIG. 20 is a diagram showing a configuration example of the signal processing device 100 that executes the signal processing method according to the first embodiment. As shown in FIG. 20, the signal processing device 100 includes a first sensor 200-1 to an M-th sensor 200-M, M analog front ends 210-1 to 210-M, a processing circuit 110, a storage circuit 120, an operation unit 130, a display unit 140, a sound output unit 150, and a communication unit 160. In the signal processing device 100, a part of the components in FIG. 20 may be omitted or changed, or other components may be added. For example, the first sensor 200-1 to the M-th sensor 200-M and the analog front ends 210-1 to 210-M may not be components of the signal processing device 100.

Each of the first sensor 200-1 to the M-th sensor 200-M detects a physical quantity generated by a vibration of an object, and outputs a signal having a magnitude corresponding to the detected physical quantity. The output signals of the first sensor 200-1 to the M-th sensor 200-M are input to the analog front ends 210-1 to 210-M, respectively.

The analog front ends 210-1 to 210-M execute amplification processing, A/D transformation processing, and the like on the output signals of the first sensor 200-1 to the M-th sensor 200-M, respectively, and output digital time-series signals.

The processing circuit 110 acquires, as the first measurement data $D_1$ to the M-th measurement data $D_M$, M digital time-series signals output from the analog front ends 210-1 to 210-M, and executes signal processing. Specifically, the processing circuit 110 executes a signal processing program 121 stored in the storage circuit 120 to execute various types of calculation processing on the first measurement data $D_1$ to the M-th measurement data $D_M$. In addition, the processing circuit 110 executes various types of processing according to an operation signal from the operation unit 130, processing of transmitting a display signal for displaying various types of information on the display unit 140, processing of transmitting a sound signal for generating various sounds to the sound output unit 150, and processing of controlling the communication unit 160 to execute data communication with an external device (not shown). The processing circuit 110 is implemented by, for example, a CPU or a DSP. The CPU is an abbreviation for central processing unit, and the DSP is an abbreviation for digital signal processor.

The processing circuit 110 executes the signal processing program 121, thereby functioning as a measurement data acquisition circuit 111, a Lissajous figure generation circuit 112, a polar coordinate transformation circuit 113, a first angle maximum peak intensity calculation circuit 114, and a second angle maximum peak intensity calculation circuit 115. That is, the signal processing device 100 includes the measurement data acquisition circuit 111, the Lissajous figure generation circuit 112, the polar coordinate transformation circuit 113, the first angle maximum peak intensity calculation circuit 114, and the second angle maximum peak intensity calculation circuit 115.

The measurement data acquisition circuit 111 acquires, for each integer i of 1 or more and M or less, the i-th measurement data $D_i$ based on a signal output from an i-th sensor 200-$i$ that detects a physical quantity generated by the vibration of the object. M is a predetermined integer of 2 or more. The measurement data acquisition circuit 111 acquires at least the first measurement data $D_1$ and the second measurement data $D_2$. For example, the measurement data acquisition circuit 111 may acquire the first measurement data $D_1$, the second measurement data $D_2$, and the third measurement data $D_3$. That is, the measurement data acquisition circuit 111 executes the measurement data acquisition step S1 in FIG. 1. The i-th measurement data $D_i$ acquired by the measurement data acquisition circuit 111 is stored in the storage circuit 120.

The Lissajous figure generation circuit 112 generates a Lissajous figure based on the first measurement data $D_1$ to the M-th measurement data $D_M$ that are acquired by the measurement data acquisition circuit 111. The Lissajous figure generation circuit 112 generates a Lissajous figure based on at least the first measurement data $D_1$ and the second measurement data $D_2$. For example, the Lissajous figure generation circuit 112 may generate a Lissajous figure based on the first measurement data $D_1$, the second measurement data $D_2$, and the third measurement data $D_3$. Specifically, first, the Lissajous figure generation circuit 112 divides, for each integer i of 1 or more and M or less, the i-th measurement data $D_i$ into the N data strings $D_{i-1}$ to $D_{i-N}$. For example, the Lissajous figure generation circuit 112 executes, for each integer i of 1 or more and M or less, fast Fourier transform on the i-th measurement data $D_i$ to generate the i-th FFT data $D_{FFTi}$, calculates a period of a signal component having the maximum intensity based on the first FFT data $D_{FFT1}$ to the M-th FFT data $D_{FFTM}$, and divides the i-th measurement data $D_i$ at a time interval of n times the period to generate the N data strings $D_{i-1}$ to $D_{i-N}$. Next, the Lissajous figure generation circuit 112 averages the N data strings $D_{i-1}$ to $D_{i-N}$ to generate the i-th averaged data string $D_{AVGi}$. Then, the Lissajous figure generation circuit 112 generates a Lissajous figure in which the i-th average data string $D_{AVGi}$ is assigned to the i-th axis. As described above, the Lissajous figure generation circuit 112 executes the Lissajous figure generation step S2 in FIG. 1, specifically, steps S21 to S23 in FIG. 2 and steps S211 to S219 in FIG. 3. The Lissajous figure generated by the Lissajous figure generation circuit 112 is stored in the storage circuit 120.

The polar coordinate transformation circuit 113 transforms the coordinates of each point in the Lissajous figure generated by the Lissajous figure generation circuit 112 into polar coordinates, and generates time series data of a first angle which is an angle formed by a second axis and a straight line. The straight line is obtained by projecting a straight line passing through an origin and each point in the Lissajous figure onto a plane including a first axis and the second axis. In addition, in the polar coordinate transformation step S3, when the integer M is 3 or more, the signal processing device 100 may generate time series data of a second angle which is an angle formed by a third axis and the straight line passing through the origin and each point in the Lissajous figure. That is, the polar coordinate transformation circuit 113 executes the polar coordinate transformation step S3 in FIG. 1. The time series data of the first angle and the time series data of the second angle that are generated by the polar coordinate transformation circuit 113 are stored in the storage circuit 120.

The first angle maximum peak intensity calculation circuit 114 executes the frequency analysis on the time series data of the first angle generated by the polar coordinate transformation circuit 113, and calculates the first maximum peak intensity which is the maximum peak intensity in the first frequency spectrum obtained by the frequency analysis. That is, the first angle maximum peak intensity calculation circuit 114 executes the first angle maximum peak intensity calculation step S4 in FIG. 1, specifically, steps S41 and S42 in FIG. 12. The first maximum peak intensity calculated by the first angle maximum peak intensity calculation circuit 114 is stored in the storage circuit 120.

The second angle maximum peak intensity calculation circuit 115 executes frequency analysis on the time series data of the second angle generated by the polar coordinate transformation circuit 113, and calculates the second maximum peak intensity which is the maximum peak intensity in the second frequency spectrum obtained by the frequency analysis. That is, the second angle maximum peak intensity calculation circuit 115 executes the second angle maximum peak intensity calculation step S5 in FIG. 1, specifically, steps S51 and S52 in FIG. 13. The second maximum peak intensity calculated by the second angle maximum peak intensity calculation circuit 115 is stored in the storage circuit 120.

The storage circuit 120 includes a ROM and a RAM (not shown). ROM is an abbreviation for read only memory, and RAM is an abbreviation for random access memory. The ROM stores various programs such as the signal processing program 121 and predetermined data, and the RAM stores data generated by the processing circuit 110. The RAM is also used as a work area of the processing circuit 110, and stores programs and data that are read from the ROM, data received from the operation unit 130, and data temporarily generated by the processing circuit 110.

The operation unit 130 is an input device including an operation key, a button switch, and the like, and outputs, to the processing circuit 110, an operation signal corresponding to an operation performed by the user.

The display unit 140 is a display device including an LCD or the like, and displays various types of information based on the display signal output from the processing circuit 110. LCD is an abbreviation for liquid crystal display. The display unit 140 may be provided with a touch panel that functions as the operation unit 130. For example, the display unit 140 may display, based on the display signal output from the processing circuit 110, a screen including at least a part of the Lissajous figure, the time series data of the first angle, the time series data of the second angle, the first maximum peak intensity, and the second maximum peak intensity.

The sound output unit 150 includes a speaker and the like, and generates various sounds based on the sound signal output from the processing circuit 110. For example, the sound output unit 150 may generate, based on the sound signal output from the processing circuit 110, a sound indicating start or end of the signal processing.

The communication unit 160 executes various types of control for establishing data communication between the processing circuit 110 and the external device. For example, the communication unit 160 may transmit, to the external device, information including at least a part of the Lissajous figure, the time series data of the first angle, the time series data of the second angle, the first maximum peak intensity, and the second maximum peak intensity, and the external device may display at least a part of the received information on a display unit (not shown).

At least a part of the measurement data acquisition circuit 111, the Lissajous figure generation circuit 112, the polar coordinate transformation circuit 113, the first angle maximum peak intensity calculation circuit 114, and the second angle maximum peak intensity calculation circuit 115 may be implemented by dedicated hardware. In addition, the signal processing device 100 may be a single device or may include a plurality of devices. For example, the first sensor 200-1 to the M-th sensor 200-M and the analog front ends 210-1 to 210-M may be provided in a first device, and the processing circuit 110, the storage circuit 120, the operation unit 130, the display unit 140, the sound output unit 150, and the communication unit 160 may be provided in a second device separate from the first device. For example, the processing circuit 110 and the storage circuit 120 may be implemented by a device such as a cloud server. The device may generate information of the Lissajous figure, the time series data of the first angle, the time series data of the second angle, the first maximum peak intensity, and the second maximum peak intensity, and transmit, via a communication line, the generated information to a terminal including the operation unit 130, the display unit 140, the sound output unit 150, and the communication unit 160.

1-1-4. Operation and Effect

In the signal processing method according to the first embodiment described above, when the vibration of the object is constituted by a continuous rotational movement, if each point in the Lissajous figure is represented by polar coordinates, the difference in the stability of the vibration appears significantly at the first angle or the second angle. Therefore, the first maximum peak intensity which is the maximum peak intensity in the first frequency spectrum obtained by the frequency analysis on the time series data of the first angle, and the second maximum peak intensity which is the maximum peak intensity in the second frequency spectrum obtained by the frequency analysis on the time series data of the second angle are correlated with the symmetry and the smoothness of the rotational movement of the vibration, and thus are indexes indicating the state of the object. The user or the signal processing device 100 can easily determine the state of the object by comparing the first maximum peak intensity with the first threshold value or comparing the second maximum peak intensity with the second threshold value. As described above, according to the signal processing method in the first embodiment, the signal processing device 100 can calculate the index for easily determining the state of the object based on the physical quantity generated by the vibration of the object.

According to the signal processing method in the first embodiment, since the first angle and the second angle are dimensionless values, the first maximum peak intensity and the second maximum peak intensity are constant regardless of the characteristics and the installation place of the object, and the first threshold value and the second threshold value for determining the state of the object can also be constant.

1-2. Second Embodiment

Hereinafter, in a second embodiment, the same components as those in the first embodiment are denoted by the same reference numerals, the same description as that of the first embodiment is omitted or simplified, and contents different from those in the first embodiment will be mainly described.

Since a flowchart showing a procedure of a signal processing method according to the second embodiment is the same as that in FIG. 1, the illustration thereof is omitted. In the signal processing method according to the second embodiment, in the first angle maximum peak intensity calculation step S4, the signal processing device 100 calculates a first maximum peak intensity only in a predetermined frequency band. Similarly, in the second angle maximum peak intensity calculation step S5, the signal processing device 100 calculates a second maximum peak intensity only in a predetermined frequency band.

Figure 21:
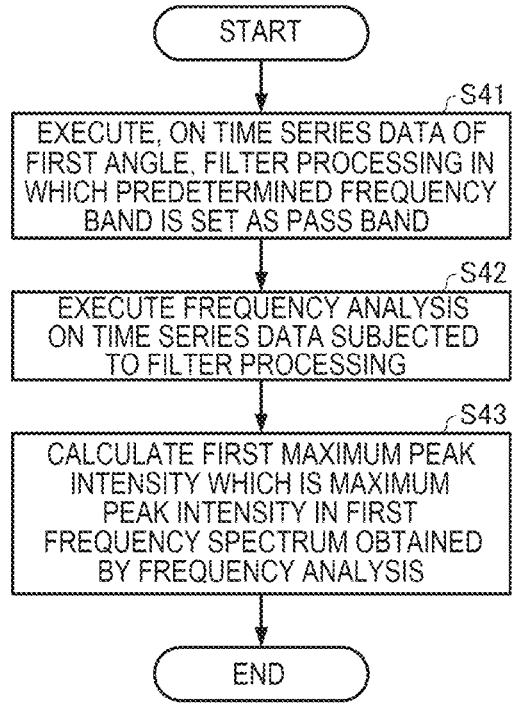
FIG. 21 is a flowchart showing an example of a procedure of a first angle maximum peak intensity calculation step according to a second embodiment.

FIG. 21 is a flowchart showing an example of a procedure of the first angle maximum peak intensity calculation step S4 according to the second embodiment. As shown in FIG. 21, first, in step S41, the signal processing device 100 executes, on the time series data of the first angle generated in the polar coordinate transformation step S3 in FIG. 1, filter processing in which the predetermined frequency band is set as a pass band. The filter processing is low-pass filter processing, band-pass filter processing, or high-pass filter processing for attenuating a noise component or an unnecessary frequency component having high intensity without attenuating a frequency component to which attention is to be paid. For example, when attention is paid to a predetermined harmonic with respect to the fundamental wave of the vibration of the object, in step S41, the signal processing device 100 may execute the filter processing of attenuating the fundamental wave without attenuating the harmonic.

Next, in step S42, the signal processing device 100 executes frequency analysis on the time series data of the first angle subjected to filter processing in step S41. Then, in step S43, the signal processing device 100 calculates the first maximum peak intensity which is the maximum peak intensity in a first frequency spectrum obtained by the frequency analysis in step S42.

As described above, in the first angle maximum peak intensity calculation step S4, the signal processing device 100 executes, on the time series data of the first angle, filter processing in which the predetermined frequency band is set as a pass band, executes frequency analysis on the time series data of the first angle subjected to filter processing, and calculates the first maximum peak intensity which is the maximum peak intensity in the first frequency spectrum obtained by the frequency analysis. In the first angle maximum peak intensity calculation step S4, the signal processing device 100 may execute frequency analysis on the time series data of the first angle and calculate, as the first maximum peak intensity, the maximum peak intensity included in the predetermined frequency band of the first frequency spectrum obtained by the frequency analysis.

Figure 22:
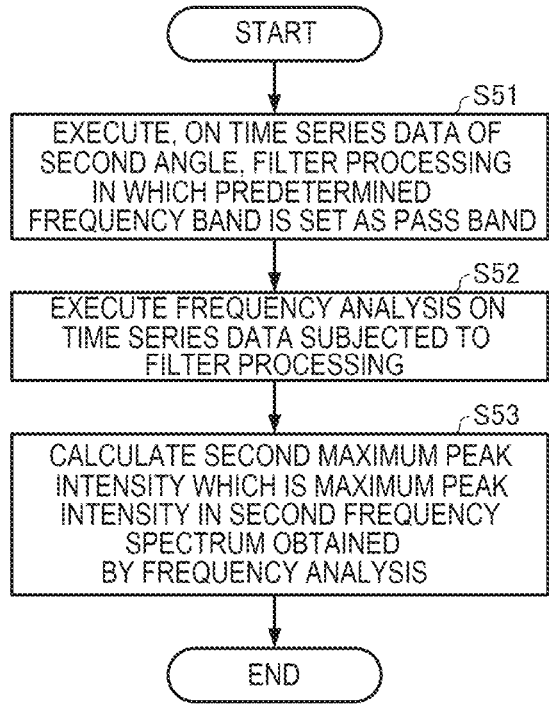
FIG. 22 is a flowchart showing an example of a procedure of a second angle maximum peak intensity calculation step according to the second embodiment.

FIG. 22 is a flowchart showing an example of a procedure of the second angle maximum peak intensity calculation step S5 according to the second embodiment. As shown in FIG. 22, first, in step S51, the signal processing device 100 executes, on the time series data of the second angle generated in the polar coordinate transformation step S3 in FIG. 1, filter processing in which the predetermined frequency band is set as a pass band. The filter processing is low-pass filter processing, band-pass filter processing, or high-pass filter processing for attenuating a noise component or an unnecessary frequency component having high intensity without attenuating a frequency component to which attention is to be paid. For example, when attention is paid to a predetermined harmonic with respect to the fundamental wave of the vibration of the object, in step S51, the signal processing device 100 may execute filter processing of attenuating the fundamental wave without attenuating the harmonic.

Next, in step S52, the signal processing device 100 executes frequency analysis on the time series data of the second angle subjected to filter processing in step S51. Then, in step S53, the signal processing device 100 calculates a second maximum peak intensity which is the maximum peak intensity in a second frequency spectrum obtained by the frequency analysis in step S52.

As described above, in the second angle maximum peak intensity calculation step S5, the signal processing device 100 executes, on the time series data of the second angle, filter processing in which the predetermined frequency band is set as a pass band, executes frequency analysis on the time series data of the second angle subjected to filter processing, and calculates the second maximum peak intensity which is the maximum peak intensity in the second frequency spectrum obtained by the frequency analysis. In the second angle maximum peak intensity calculation step S5, the signal processing device 100 may execute frequency analysis on the time series data of the second angle and calculate, as the second maximum peak intensity, the maximum peak intensity included in the predetermined frequency band of the second frequency spectrum obtained by the frequency analysis.

Since a diagram of a configuration example of the signal processing device 100 according to the second embodiment is the same as that in FIG. 20, the illustration thereof is omitted. In the second embodiment, the first angle maximum peak intensity calculation circuit 114 calculates a first maximum peak intensity only in a predetermined frequency band. Similarly, the second angle maximum peak intensity calculation circuit 115 calculates a second maximum peak intensity only in a predetermined frequency band.

Specifically, the first angle maximum peak intensity calculation circuit 114 executes, on the time series data of the first angle generated by the polar coordinate transformation circuit 113, filtering processing in which the predetermined frequency band is set as a pass band, executes frequency analysis on the time series data of the first angle subjected to filter processing, and calculates the first maximum peak intensity which is the maximum peak intensity in the first frequency spectrum obtained by the frequency analysis. That is, the first angle maximum peak intensity calculation circuit 114 executes the first angle maximum peak intensity calculation step S4 in FIG. 1, specifically, steps S41 to S43 in FIG. 21. The first maximum peak intensity calculated by the first angle maximum peak intensity calculation circuit 114 is stored in the storage circuit 120. In addition, the first angle maximum peak intensity calculation circuit 114 may execute frequency analysis on the time series data of the first angle generated by the polar coordinate transformation circuit 113, and calculate, as the first maximum peak intensity, the maximum peak intensity included in the predetermined frequency band of the first frequency spectrum obtained by the frequency analysis.

Similarly, the second angle maximum peak intensity calculation circuit 115 executes, on the time series data of the second angle generated by the polar coordinate transformation circuit 113, filtering processing in which the predetermined frequency band is set as a pass band, executes frequency analysis on the time series data of the second angle subjected to filter processing, and calculates the second maximum peak intensity which is the maximum peak intensity in the second frequency spectrum obtained by the frequency analysis. That is, the second angle maximum peak intensity calculation circuit 115 executes the second angle maximum peak intensity calculation step S5 in FIG. 1, specifically, steps S51 to S53 in FIG. 22. The second maximum peak intensity calculated by the second angle maximum peak intensity calculation circuit 115 is stored in the storage circuit 120. In addition, the second angle maximum peak intensity calculation circuit 115 may execute frequency analysis on the time series data of the second angle generated by the polar coordinate transformation circuit 113 and calculate, as the second maximum peak intensity, the maximum peak intensity included in the predetermined frequency band of the second frequency spectrum obtained by the frequency analysis.

Since other configurations of the signal processing device 100 according to the second embodiment are the same as those in the first embodiment, the description thereof will be omitted.

According to the signal processing method in the second embodiment described above, the same effects as those of the signal processing method according to the first embodiment can be attained. Furthermore, according to the signal processing method in the second embodiment, the signal processing device 100 can calculate, as the first maximum peak intensity, the peak intensity of the frequency component to which attention is to be paid only in the predetermined frequency band even when the intensity of the noise component or the unnecessary frequency component is large in the time series data of the first angle. Similarly, the signal processing device 100 can calculate, as the second maximum peak intensity, the peak intensity of the frequency component to which attention is to be paid only in the predetermined frequency band even when the intensity of the noise component or the unnecessary frequency component is large in the time series data of the second angle. Therefore, according to the signal processing method in the second embodiment, an index by which the state of the object is more indicated can be obtained.

1-3. Third Embodiment

Hereinafter, in a third embodiment, the same components as those in the first embodiment or the second embodiment are denoted by the same reference numerals, the same description as that of the first embodiment or the second embodiment is omitted or simplified, and contents different from those in the first embodiment or the second embodiment will be mainly described.

Figure 23:
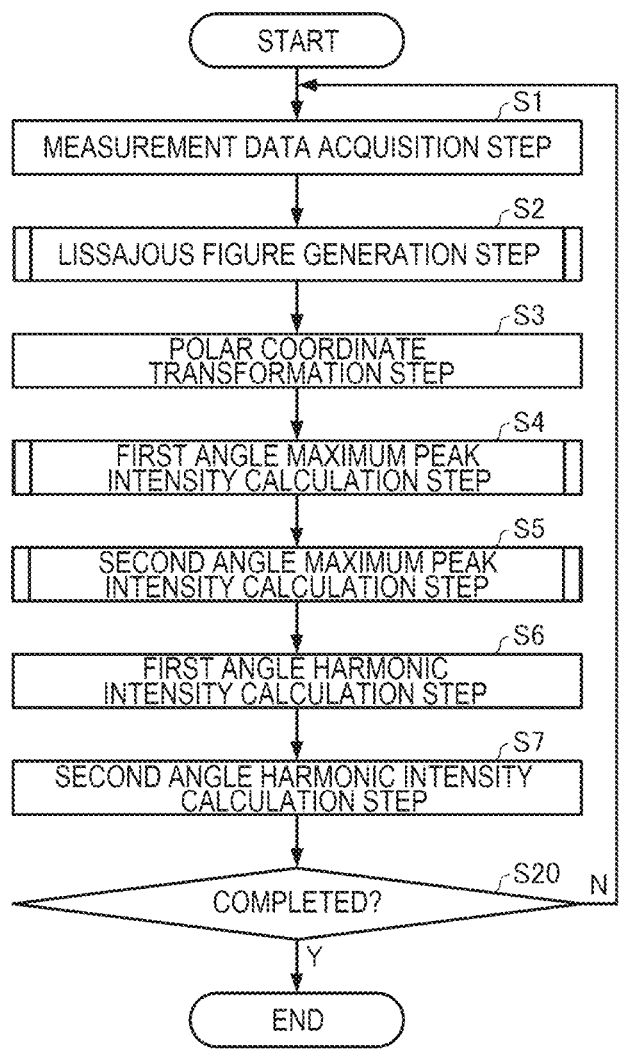
FIG. 23 is a flowchart showing a procedure of a signal processing method according to a third embodiment.

FIG. 23 is a flowchart showing a procedure of a signal processing method according to the third embodiment. As shown in FIG. 23, the signal processing method according to the third embodiment includes the measurement data acquisition step S1, the Lissajous figure generation step S2, the polar coordinate transformation step S3, the first angle maximum peak intensity calculation step S4, the second angle maximum peak intensity calculation step S5, a first angle harmonic intensity calculation step S6, and a second angle harmonic intensity calculation step S7. In the signal processing method according to the third embodiment, a part of the steps may be omitted or changed, or other steps may be added. The signal processing method according to the third embodiment is executed by, for example, the signal processing device 100. A configuration example of the signal processing device 100 that executes the signal processing method according to the third embodiment will be described later.

As shown in FIG. 23, first, as in the first embodiment and the second embodiment, the signal processing device 100 repeats the measurement data acquisition step S1, the Lissajous figure generation step S2, the polar coordinate transformation step S3, the first angle maximum peak intensity calculation step S4, and the second angle maximum peak intensity calculation step S5.

Next, in the first angle harmonic intensity calculation step S6, the signal processing device 100 calculates, based on the first frequency spectrum obtained by the frequency analysis in the first angle maximum peak intensity calculation step S4, a total value of intensities of harmonics having frequencies of an even multiple of the fundamental wave of the vibration of the object and a total value of intensities of harmonics having frequencies of an odd multiple of the fundamental wave.

Next, in the second angle harmonic intensity calculation step S7, the signal processing device 100 calculates, based on the second frequency spectrum obtained by the frequency analysis in the second angle maximum peak intensity calculation step S5, a total value of the intensities of the harmonics having frequencies of an even multiple of the fundamental wave of the vibration of the object and a total value of the intensities of the harmonics having frequencies of an odd multiple of the fundamental wave.

Then, until the signal processing is completed (N in step S20), the signal processing device 100 repeats steps S1 to S7.

Figure 24:
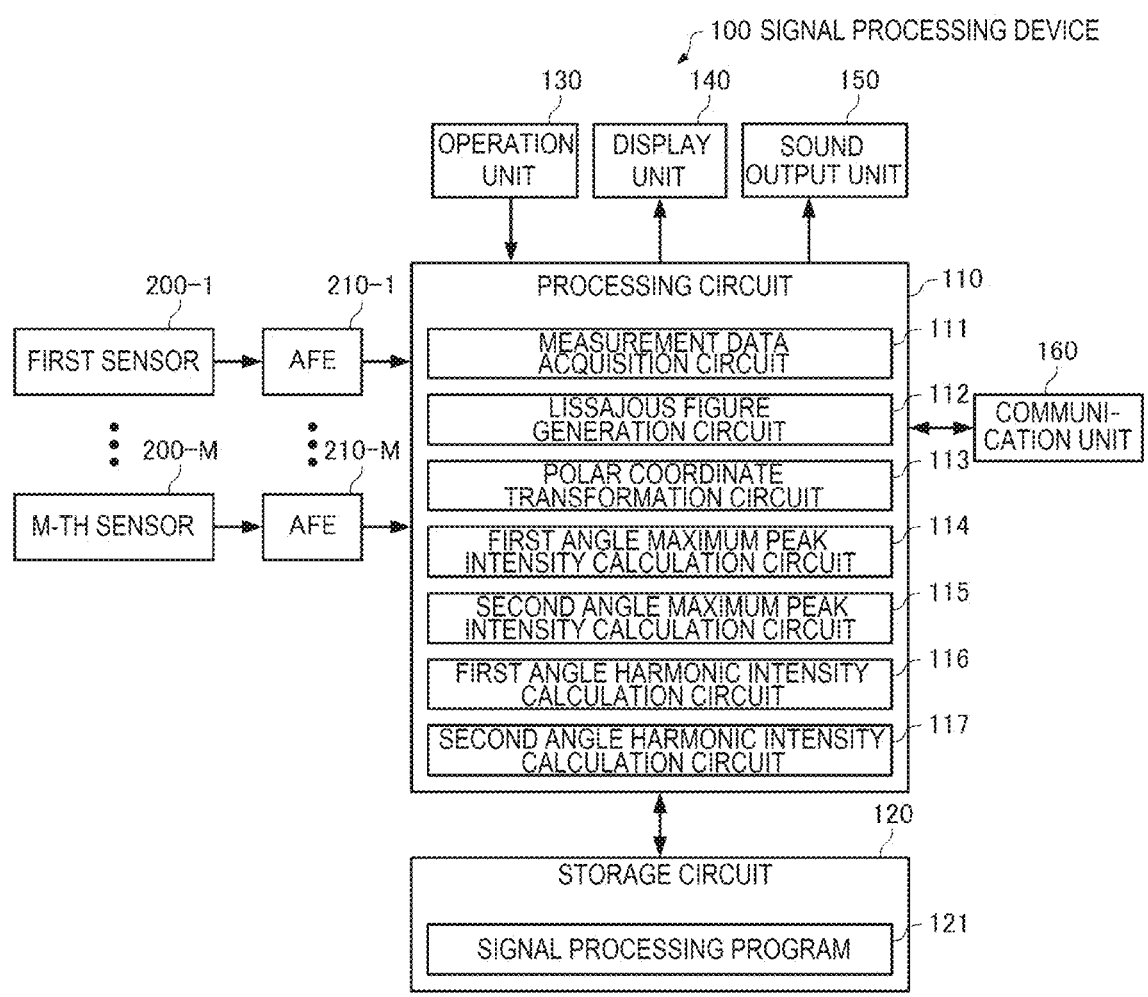
FIG. 24 is a diagram showing a configuration example of a signal processing device that executes the signal processing method according to the third embodiment.

FIG. 24 is a diagram showing a configuration example of the signal processing device 100 that executes the signal processing method according to the third embodiment. As shown in FIG. 24, the signal processing device 100 includes the first sensor 200-1 to the M-th sensor 200-M, the M analog front ends 210-1 to 210-M, the processing circuit 110, the storage circuit 120, the operation unit 130, the display unit 140, the sound output unit 150, and the communication unit 160. In the signal processing device 100, a part of the components in FIG. 24 may be omitted or changed, or other components may be added. For example, the first sensor 200-1 to the M-th sensor 200-M and the analog front ends 210-1 to 210-M may not be components of the signal processing device 100.

Since configurations and functions of the first sensor 200-1 to the M-th sensor 200-M, the analog front ends 210-1 to 210-M, the storage circuit 120, the operation unit 130, the display unit 140, the sound output unit 150, and the communication unit 160 are the same as those in the first embodiment or the second embodiment, the description thereof will be omitted.

The processing circuit 110 executes the signal processing program 121 stored in the storage circuit 120, thereby functioning as the measurement data acquisition circuit 111, the Lissajous figure generation circuit 112, the polar coordinate transformation circuit 113, the first angle maximum peak intensity calculation circuit 114, the second angle maximum peak intensity calculation circuit 115, a first angle harmonic intensity calculation circuit 116, and a second angle harmonic intensity calculation circuit 117. That is, the signal processing device 100 includes the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, and the second angle harmonic intensity calculation circuit 117.

The measurement data acquisition circuit 111, the Lissajous figure generation circuit 112, the polar coordinate transformation circuit 113, the first angle maximum peak intensity calculation circuit 114, and the second angle maximum peak intensity calculation circuit 115 execute the measurement data acquisition step S1, the Lissajous figure generation step S2, the polar coordinate transformation step S3, the first angle maximum peak intensity calculation step S4, and the second angle maximum peak intensity calculation step S5 in FIG. 23, respectively. Since the functions of the measurement data acquisition circuit 111, the Lissajous figure generation circuit 112, the polar coordinate transformation circuit 113, the first angle maximum peak intensity calculation circuit 114, and the second angle maximum peak intensity calculation circuit 115 are the same as those in the first embodiment or the second embodiment, the description thereof will be omitted.

The first angle harmonic intensity calculation circuit 116 calculates, based on the first frequency spectrum obtained by the frequency analysis of the first angle maximum peak intensity calculation circuit 114, the total value of the intensities of the harmonics having frequencies of an even multiple of the fundamental wave of the vibration of the object and the total value of the intensities of the harmonics having frequencies of an odd multiple of the fundamental wave. That is, the first angle harmonic intensity calculation circuit 116 executes the first angle harmonic intensity calculation step S6 in FIG. 23. The total value of the intensities of the harmonics calculated by the first angle harmonic intensity calculation circuit 116 is stored in the storage circuit 120.

The second angle harmonic intensity calculation circuit 117 calculates, based on the second frequency spectrum obtained by the frequency analysis of the second angle maximum peak intensity calculation circuit 115, a total value of the intensities of the harmonics having frequencies of an even multiple of the fundamental wave of the vibration of the object and a total value of the intensities of the harmonics having frequencies of an odd multiple of the fundamental wave. That is, the second angle harmonic intensity calculation circuit 117 executes the second angle harmonic intensity calculation step S7 in FIG. 23. The total value of the intensities of the odd-order harmonics and the total value of the intensities of the even-order harmonics that are calculated by the second angle harmonic intensity calculation circuit 117 are stored in the storage circuit 120.

The display unit 140 may display, based on a display signal output from the processing circuit 110, a screen including at least a part of the total value of the intensities of the odd-order harmonics and the total value of the intensities of the even-order harmonics.

The communication unit 160 may transmit, to an external device, information including at least a part of the total value of the intensities of the odd-order harmonics and the total value of the intensities of the even-order harmonics, and the external device may display at least a part of the received information on a display unit (not shown).

At least a part of the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, and the second angle harmonic intensity calculation circuit 117 may be implemented by dedicated hardware.

According to the signal processing method in the third embodiment described above, the same effects as those of the signal processing method according to the first embodiment or the second embodiment can be attained. In addition, according to the signal processing method in the third embodiment, the higher the symmetry of the vibration of the object is, the larger the total value of the intensities of the odd-order harmonics in the first frequency spectrum is, and the lower the symmetry of the vibration of the object is, the larger the total value of the intensities of the even-order harmonics in the first frequency spectrum is. Similarly, the higher the symmetry of the vibration of the object is, the larger the total value of the intensities of the odd-order harmonics in the second frequency spectrum is, and the lower the symmetry of the vibration of the object is, the larger the total value of the intensities of the even-order harmonics in the second frequency spectrum is. Therefore, according to the signal processing method in the third embodiment, an index effective for determining the symmetry of the vibration of the object can be obtained.

1-4. Fourth Embodiment

Hereinafter, in a fourth embodiment, since the same components as those in any one of the first embodiment to the third embodiment are denoted by the same reference numerals, the same description as that of any one of the first embodiment to the third embodiment is omitted or simplified, and contents different from those of any one of the first embodiment to the third embodiment will be mainly described.

Figure 25:
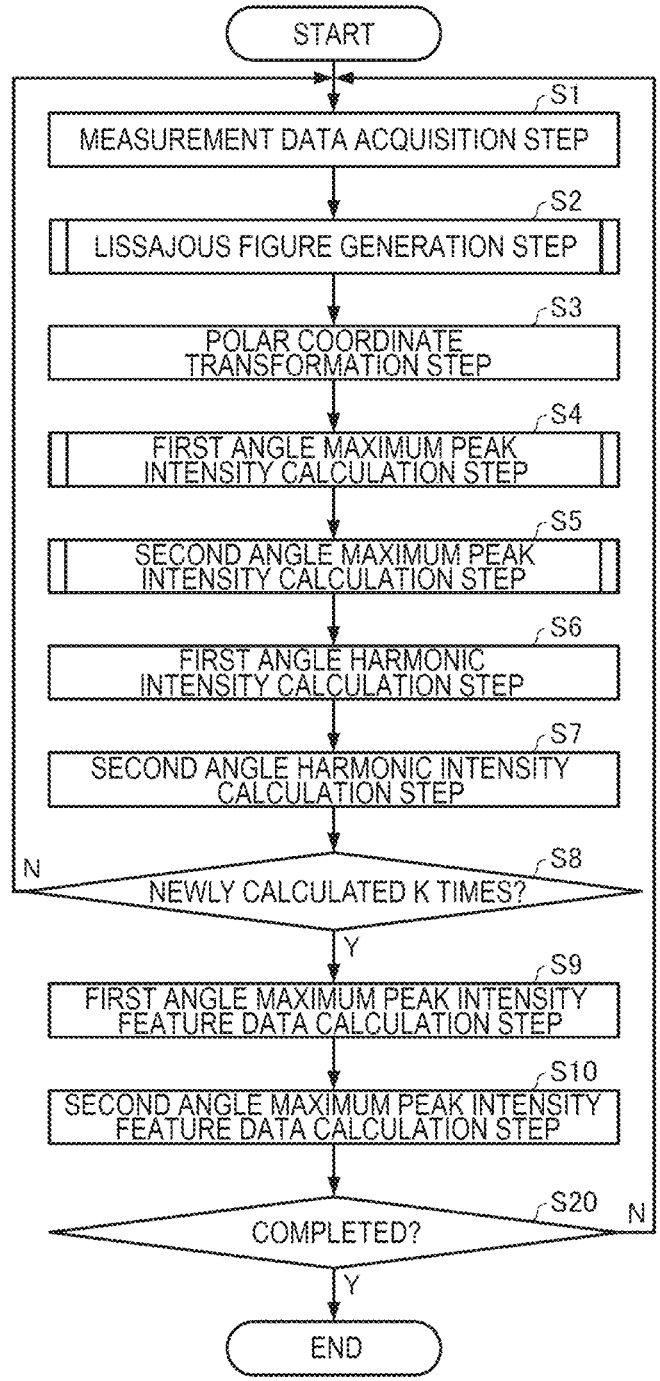
FIG. 25 is a flowchart showing a procedure of a signal processing method according to a fourth embodiment.

FIG. 25 is a flowchart showing a procedure of a signal processing method according to the fourth embodiment. As shown in FIG. 25, the signal processing method according to the fourth embodiment includes the measurement data acquisition step S1, the Lissajous figure generation step S2, the polar coordinate transformation step S3, the first angle maximum peak intensity calculation step S4, the second angle maximum peak intensity calculation step S5, the first angle harmonic intensity calculation step S6, the second angle harmonic intensity calculation step S7, a first angle maximum peak intensity feature data calculation step S9, and a second angle maximum peak intensity feature data calculation step S10. In the signal processing method according to the fourth embodiment, a part of the steps may be omitted or changed, or other steps may be added. The signal processing method according to the fourth embodiment is executed by, for example, the signal processing device 100. A configuration example of the signal processing device 100 that executes the signal processing method according to the fourth embodiment will be described later.

As shown in FIG. 25, first, as in the first embodiment to the third embodiment, the signal processing device 100 sequentially executes the measurement data acquisition step S1, the Lissajous figure generation step S2, the polar coordinate transformation step S3, the first angle maximum peak intensity calculation step S4, and the second angle maximum peak intensity calculation step S5. Further, as in the third embodiment, the signal processing device 100 sequentially executes the first angle harmonic intensity calculation step S6 and the second angle harmonic intensity calculation step S7.

The signal processing device 100 repeats steps S1 to S7 until the first angle maximum peak intensity and the second angle maximum peak intensity are newly calculated K times in step S8. Accordingly, the signal processing device 100 generates the time series data of the first maximum peak intensity in the first angle maximum peak intensity calculation step S4, and generates the time series data of the second maximum peak intensity in the second angle maximum peak intensity calculation step S5.

Then, when the first angle maximum peak intensity and the second angle maximum peak intensity are newly calculated K times in step S8, in the first angle maximum peak intensity feature data calculation step S9, the signal processing device 100 then calculates at least one of an average value and a variation of the time series data of the first maximum peak intensity generated in the first angle maximum peak intensity calculation step S4. The variation of the time series data of the first maximum peak intensity may be a difference between a value of the maximum data and a value of the minimum data that are included in the time series data, or may be a standard deviation value or a variance value of the time series data.

Next, in the second angle maximum peak intensity feature data calculation step S10, the signal processing device 100 calculates at least one of an average value and a variation of the time series data of the second maximum peak intensity generated in the second angle maximum peak intensity calculation step S5. The variation of the time series data of the second maximum peak intensity may be a difference between a value of the maximum data and a value of the minimum data that are included in the time series data, or may be a standard deviation value or a variance value of the time series data.

Then, the signal processing device 100 repeats steps S1 to S10 until the signal processing is completed (N in step S20).

FIG. 26 is a diagram showing an example of time series data of the maximum peak intensity of θ which is the first maximum peak intensity corresponding to the vibration of the electric motor A, and time series data of the maximum peak intensity of θ which is the first maximum peak intensity corresponding to the vibration of the electric motor B. In FIG. 26, the horizontal axis represents time, and the vertical axis represents intensities. The solid line indicates the time series data of the maximum peak intensity of θ corresponding to the vibration of the electric motor A. The broken line indicates the time series data of the maximum peak intensity of θ corresponding to the vibration of the electric motor B. The two pieces of time series data shown in FIG. 26 are time series data for 100 seconds of the maximum peak intensity of θ calculated every 0.1 seconds, and correspond to time series data calculated when K in step S8 in FIG. 25 is 1,000.

FIG. 27 is a diagram showing an example of time series data of the maximum peak intensity of φ which is the second maximum peak intensity corresponding to the vibration of the electric motor A, and time series data of the maximum peak intensity of φ which is the second maximum peak intensity corresponding to the vibration of the electric motor B. In FIG. 27, the horizontal axis represents time, and the vertical axis represents intensities. The solid line indicates the time series data of the maximum peak intensity of φ corresponding to the vibration of the electric motor A. The broken line indicates the time series data of the maximum peak intensity of φ corresponding to the vibration of the electric motor B. The two pieces of time series data shown in FIG. 27 are time series data for 100 seconds of the maximum peak intensity of φ calculated every 0.1 seconds, and correspond to time series data calculated when K in step S8 in FIG. 25 is 1,000.

FIG. 28 is a diagram showing calculation results of an average value and a variation of the time series data of the maximum peak intensity of θ corresponding to the vibration of the electric motor A shown in FIG. 26, an average value and a variation of the time series data of the maximum peak intensity of θ corresponding to the vibration of the electric motor B shown in FIG. 26, an average value and a variation of the time series data of the maximum peak intensity of φ corresponding to the vibration of the electric motor A shown in FIG. 27, and an average value and a variation of the time series data of the maximum peak intensity of φ corresponding to the vibration of the electric motor B shown in FIG. 27. Here, a difference between the value of the maximum data and the value of the minimum data that are included in the time series data is calculated as the variation of the time series data.

In FIG. 26, the maximum peak intensity of θ corresponding to the vibration of the electric motor A stably changes in the vicinity of 1.82 rad/√Hz, whereas the maximum peak intensity of θ corresponding to the vibration of the electric motor B periodically changes from the vicinity of 0.3 rad/1 Hz to the vicinity of 1.8 rad/1 Hz. As shown in FIG. 28, in terms of the variations of the time series data of the maximum peak intensity of θ, the vibration of the electric motor B is about 4.5 times the vibration of the electric motor A, which is a significant difference between the two.

In FIG. 27, the maximum peak intensity of φ corresponding to the vibration of the electric motor A stably changes in the vicinity of 0.63 rad/1 Hz, whereas the maximum peak intensity of φ corresponding to the vibration of the electric motor B is concentrated in the vicinity of 0.16 rad/1 Hz. As shown in FIG. 28, in terms of the average values of the time series data of the maximum peak intensity of φ, the vibration of the electric motor A is about four times the vibration of the electric motor B, which is a significant difference between the two.

As described above, the average value and the variation of the time series data of the maximum peak intensities of θ and φ are effective as indexes indicating the state of the object. The average value can be said to be a more accurate index in which an influence of a sudden state change or a variation of a measurement error is reduced. In addition, the variation can be said to be an index with which a periodic fluctuation or a sudden state change of a vibration state can be captured.

Figure 29:
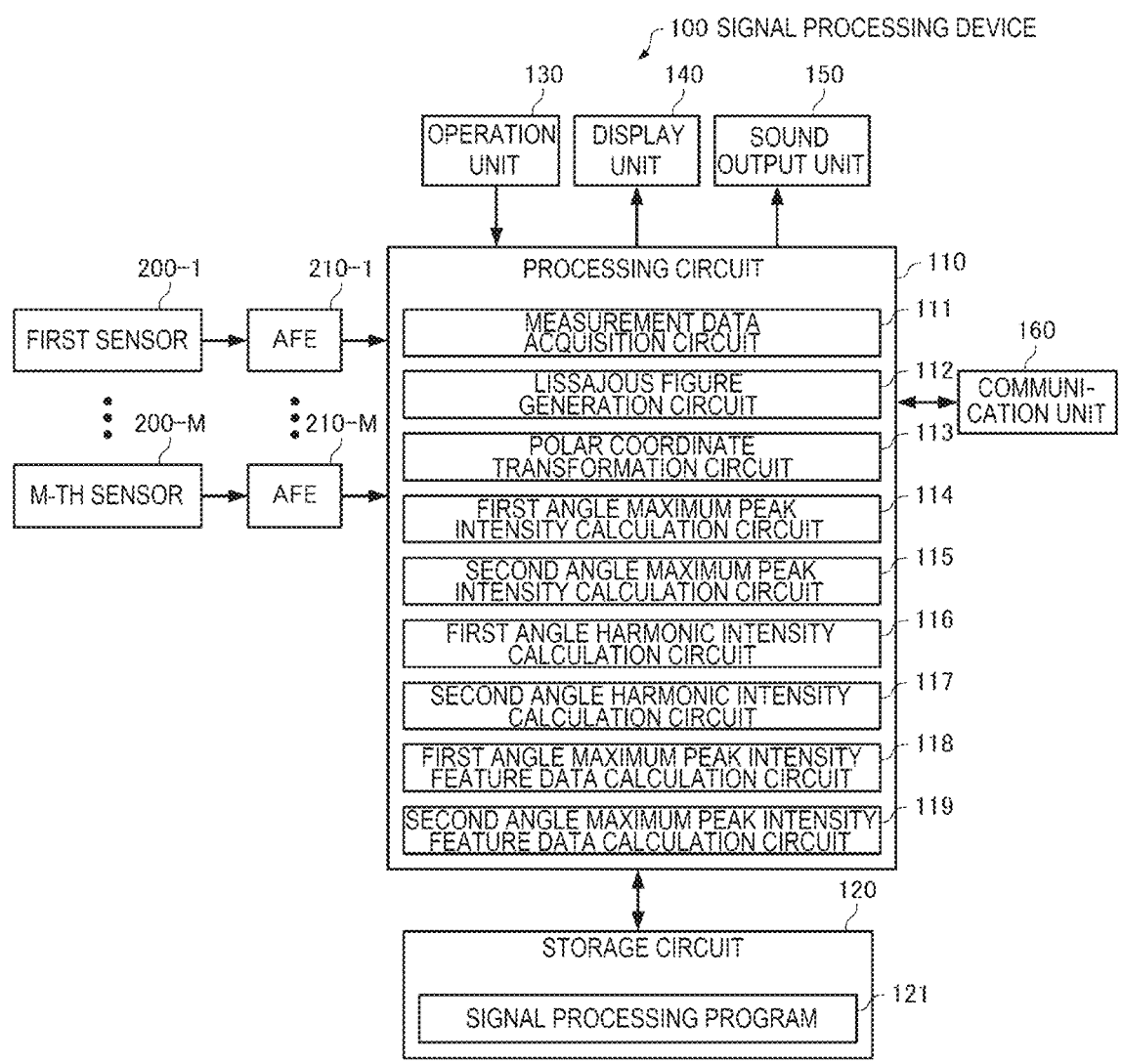
FIG. 29 is a diagram showing a configuration example of a signal processing device that executes the signal processing method according to the fourth embodiment.

FIG. 29 is a diagram showing a configuration example of the signal processing device 100 that executes the signal processing method according to the fourth embodiment. As shown in FIG. 29, the signal processing device 100 includes the first sensor 200-1 to the M-th sensor 200-M, the M analog front ends 210-1 to 210-M, the processing circuit 110, the storage circuit 120, the operation unit 130, the display unit 140, the sound output unit 150, and the communication unit 160. In the signal processing device 100, a part of the components in FIG. 29 may be omitted or changed, or other components may be added. For example, the first sensor 200-1 to the M-th sensor 200-M and the analog front ends 210-1 to 210-M may not be components of the signal processing device 100.

Since the configurations and the functions of the first sensor 200-1 to the M-th sensor 200-M, the analog front-ends 210-1 to 210-M, the storage circuit 120, the operation unit 130, the display unit 140, the sound output unit 150, and the communication unit 160 are the same as those in any one of the first embodiment to the third embodiment, the description thereof will be omitted.

The processing circuit 110 executes the signal processing program 121 stored in the storage circuit 120, thereby functioning as the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, a first angle maximum peak intensity feature data calculation circuit 118, and a second angle maximum peak intensity feature data calculation circuit 119. That is, the signal processing device 100 includes the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, and the second angle maximum peak intensity feature data calculation circuit 119.

The measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, and the second angle harmonic intensity calculation circuit 117 execute the measurement data acquisition step S1, the Lissajous figure generation step S2, the polar coordinate transformation step S3, the first angle maximum peak intensity calculation step S4, the second angle maximum peak intensity calculation step S5, the first angle harmonic intensity calculation step S6, and the second angle harmonic intensity calculation step S7 in FIG. 25, respectively. Since the functions of the measurement data acquisition circuit 111, the Lissajous figure generation circuit 112, the polar coordinate transformation circuit 113, the first angle maximum peak intensity calculation circuit 114, and the second angle maximum peak intensity calculation circuit 115 are the same as those in any one of the first embodiment to the third embodiment, the description thereof will be omitted. In addition, since the functions of the first angular harmonic intensity calculation circuit 116 and the second angular harmonic intensity calculation circuit 117 are the same as those in the third embodiment, the description thereof will be omitted.

The first angle maximum peak intensity feature data calculation circuit 118 calculates at least one of an average value and a variation of the time series data of the first maximum peak intensity generated by the first angle maximum peak intensity calculation circuit 114. The variation of the time series data of the first maximum peak intensity may be a difference between a value of the maximum data and a value of the minimum data that are included in the time series data, or may be a standard deviation value or a variance value of the time series data. That is, the first angle maximum peak intensity feature data calculation circuit 118 executes the first angle maximum peak intensity feature data calculation step S9 in FIG. 25. The average value and the variation that are calculated by the first angle maximum peak intensity feature data calculation circuit 118 are stored in the storage circuit 120.

The second angle maximum peak intensity feature data calculation circuit 119 calculates at least one of an average value and a variation of the time series data of the second maximum peak intensity generated by the second angle maximum peak intensity calculation circuit 115. The variation of the time series data of the second maximum peak intensity may be a difference between a value of the maximum data and a value of the minimum data that are included in the time series data, or may be a standard deviation value or a variance value of the time series data. That is, the second angle maximum peak intensity feature data calculation circuit 119 executes the second angle maximum peak intensity feature data calculation step S10 in FIG. 25. The average value and the variation that are calculated by the second angle maximum peak intensity feature data calculation circuit 119 are stored in the storage circuit 120.

The display unit 140 may display, based on a display signal output from the processing circuit 110, a screen including at least a part of the average value and the variation of the time series data of the first maximum peak intensity and the average value and the variation of the time series data of the second maximum peak intensity.

The communication unit 160 may transmit, to an external device, information including at least a part of the average value and the variation of the time series data of the first maximum peak intensity and the average value and the variation of the time series data of the second maximum peak intensity, and the external device may display at least a part of the received information on a display unit (not shown).

At least a part of the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, and the second angle maximum peak intensity feature data calculation circuit 119 may be implemented by dedicated hardware.

According to the signal processing method in the fourth embodiment described above, the same effects as those of the signal processing methods according to the first embodiment to the third embodiment can be attained. In addition, in the signal processing method according to the fourth embodiment, the signal processing device 100 generates the time series data of the first maximum peak intensity and the time series data of the second maximum peak intensity. Therefore, according to the signal processing method in the fourth embodiment, a user or the signal processing device 100 can observe a temporal change in the first maximum peak intensity or a temporal change in the second maximum peak intensity.

According to the signal processing method in the fourth embodiment, since the signal processing device 100 calculates the average value of the time series data of the first maximum peak intensity and the average value of the time series data of the second maximum peak intensity, a more accurate index is obtained in which the influence of a sudden state change of the object or a variation of a measurement error is reduced. In addition, according to the signal processing method in the fourth embodiment, since the signal processing device 100 calculates the variation of the time series data of the first maximum peak intensity and the variation of the time series data of the second maximum peak intensity, an index can be obtained with which a periodic fluctuation or a sudden state change of the vibration state of the object can be captured.

1-5. Fifth Embodiment

Hereinafter, in a fifth embodiment, the same components as those in any one of the first embodiment to the fourth embodiment are denoted by the same reference numerals, the same description as that of any one of the first embodiment to the fourth embodiment is omitted or simplified, and contents different from those of any one of the first embodiment to the fourth embodiment will be mainly described.

Since a flowchart showing a procedure of a signal processing method according to the fifth embodiment is the same as that in FIG. 1, FIG. 23, or FIG. 25, the illustration thereof is omitted. In the signal processing method according to the fifth embodiment, in the first angle maximum peak intensity calculation step S4, the signal processing device 100 sets a range of the first angle to $-\pi$ or more and $+\pi$ or less, and when one of two pieces of consecutive data included in time series data of the first angle is a positive peak and the other is a negative peak, the signal processing device 100 replaces the two pieces of data with 0 and executes frequency analysis. Similarly, in the second angle maximum peak intensity calculation step S5, the signal processing device 100 sets a range of the second angle to $-\pi$ or more and $+\pi$ or less, and when one of two pieces of consecutive data included in time series data of the second angle is a positive peak and the other is a negative peak, the signal processing device 100 replaces the two pieces of data with 0 and executes frequency analysis.

Figure 30:
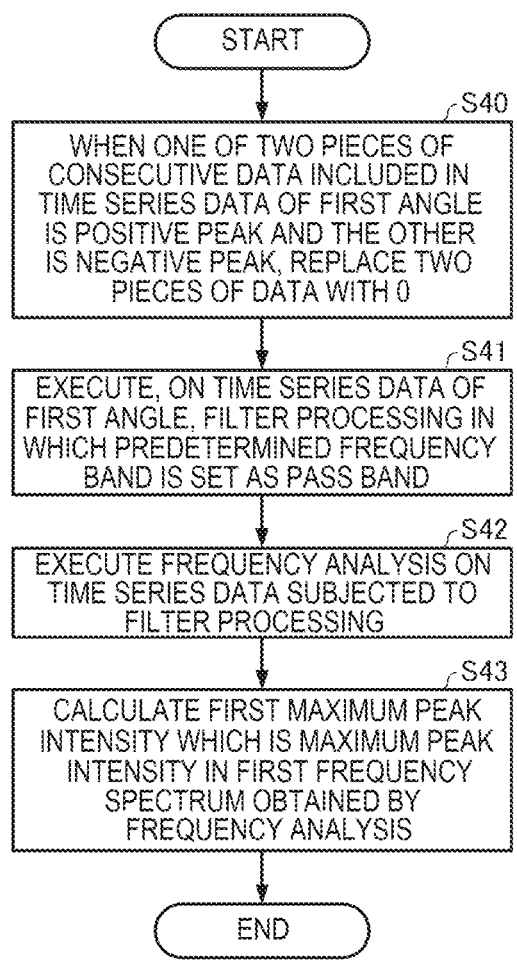
FIG. 30 is a flowchart showing an example of a procedure of a first angle maximum peak intensity calculation step according to a fifth embodiment.

FIG. 30 is a flowchart showing an example of a procedure of the first angle maximum peak intensity calculation step S4 according to the fifth embodiment. As shown in FIG. 30, first, in step S40, the signal processing device 100 replaces, with 0, data from the positive peak to the negative peak and data from the negative peak to the positive peak that are included in the time series data of the first angle generated in the polar coordinate transformation step S3 in FIG. 1, FIG. 23, or FIG. 25.

Next, in step S41, the signal processing device 100 executes, on the time series data of the first angle obtained in step S40, filter processing in which a predetermined frequency band is set as a pass band. The filter processing is low-pass filter processing, band-pass filter processing, or high-pass filter processing for attenuating a noise component or an unnecessary frequency component having high intensity without attenuating a frequency component to which attention is to be paid. For example, when attention is paid to a predetermined harmonic with respect to the fundamental wave of the vibration of the object, in step S41, the signal processing device 100 may execute the filter processing of attenuating the fundamental wave without attenuating the harmonic.

Next, in step S42, the signal processing device 100 executes frequency analysis on the time series data of the first angle subjected to filter processing in step S41. Then, in step S43, the signal processing device 100 calculates a first maximum peak intensity which is the maximum peak intensity in a first frequency spectrum obtained by the frequency analysis in step S42.

As described above, in the first angle maximum peak intensity calculation step S4, the signal processing device 100 executes, on the time series data of the first angle obtained by replacing the data from the positive peak to the negative peak and the data from the negative peak to the positive peak with 0, filter processing in which the predetermined frequency band is set as a pass band, executes frequency analysis on the time series data of the first angle subjected to filter processing, and calculates the first maximum peak intensity which is the maximum peak intensity in the first frequency spectrum obtained by the frequency analysis. Further, in the first angle maximum peak intensity calculation step S4, the signal processing device 100 may execute frequency analysis on the time series data of the first angle obtained by replacing the data from the positive peak to the negative peak and the data from the negative peak to the positive peak with 0, and calculate, as the first maximum peak intensity, the maximum peak intensity included in the predetermined frequency band of the first frequency spectrum obtained by the frequency analysis.

Figure 31:
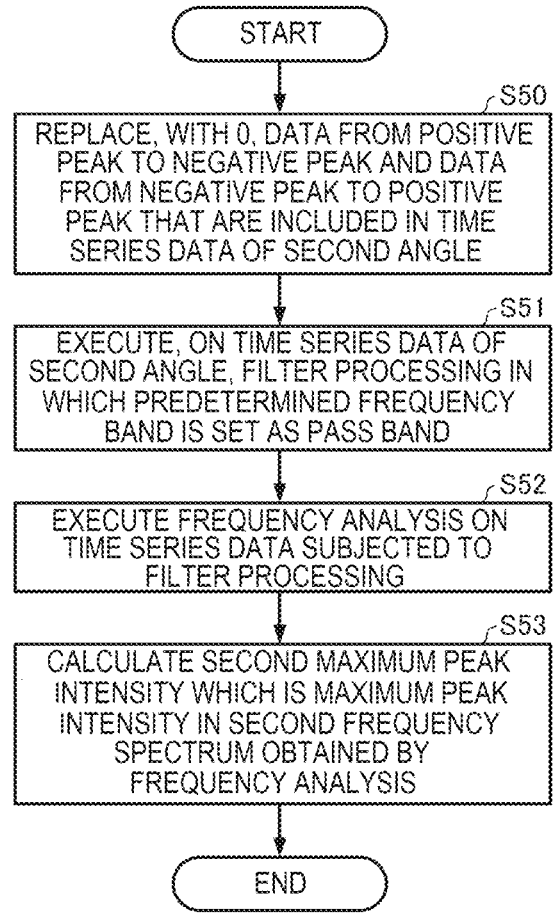
FIG. 31 is a flowchart showing an example of a procedure of a second angle maximum peak intensity calculation step according to the fifth embodiment.

FIG. 31 is a flowchart showing an example of a procedure of the second angle maximum peak intensity calculation step S5 according to the fifth embodiment. As shown in FIG. 31, first, in step S50, the signal processing device 100 replaces, with 0, the data from the positive peak to the negative peak and the data from the negative peak to the positive peak that are included in the time series data of the second angle generated in the polar coordinate transformation step S3 in FIG. 1, FIG. 23, or FIG. 25.

Next, in step S51, the signal processing device 100 executes, on the time series data of the second angle obtained in step S50, filter processing in which the predetermined frequency band is set as a pass band. The filter processing is low-pass filter processing, band-pass filter processing, or high-pass filter processing for attenuating a noise component or an unnecessary frequency component having high intensity without attenuating a frequency component to which attention is to be paid. For example, when attention is paid to a predetermined harmonic with respect to the fundamental wave of the vibration of the object, in step S51, the signal processing device 100 may execute filter processing of attenuating the fundamental wave without attenuating the harmonic.

Next, in step S52, the signal processing device 100 executes frequency analysis on the time series data of the second angle subjected to filter processing in step S51. Then, in step S53, the signal processing device 100 calculates a second maximum peak intensity which is the maximum peak intensity in a second frequency spectrum obtained by the frequency analysis in step S52.

As described above, in the second angle maximum peak intensity calculation step S5, the signal processing device 100 executes, on the time series data of the second angle obtained by replacing the data from the positive peak to the negative peak and the data from the negative peak to the positive peak with 0, filter processing in which the predetermined frequency band is set as a pass band, executes frequency analysis on the time series data of the second angle subjected to frequency analysis, and calculates the second maximum peak intensity which is the maximum peak intensity in the second frequency spectrum obtained by the frequency analysis. Further, in the second angle maximum peak intensity calculation step S5, the signal processing device 100 may execute frequency analysis on the time series data of the first angle obtained by replacing the data from the positive peak to the negative peak and the data from the negative peak to the positive peak with 0, and calculate, as the second maximum peak intensity, the maximum peak intensity included in the predetermined frequency band of the second frequency spectrum obtained by the frequency analysis.

Since a diagram of a configuration example of the signal processing device 100 according to the fifth embodiment is the same as that in FIG. 20, FIG. 24, or FIG. 29, the illustration thereof is omitted. In the fifth embodiment, the first angle maximum peak intensity calculation circuit 114 sets the range of the first angle to $-\pi$ or more and $+\pi$ or less, replaces the data from the positive peak to the negative peak and the data from the negative peak to the positive peak that are included in the time series data of the first angle with 0, and executes frequency analysis. Similarly, the second angle maximum peak intensity calculation circuit 115 sets the range of the second angle to $-\pi$ or more and $+\pi$ or less, replaces the data from the positive peak to the negative peak and the data from the negative peak to the positive peak that are included in the time series data of the second angle with 0, and executes frequency analysis.

Specifically, the first angle maximum peak intensity calculation circuit 114 executes, on the time series data of the first angle obtained by replacing the data from the positive peak to the negative peak and the data from the negative peak to the positive peak with 0, filter processing in which the predetermined frequency band is set as a pass band, executes frequency analysis on the time series data of the first angle subjected to filter processing, and calculates the first maximum peak intensity which is the maximum peak intensity in the first frequency spectrum obtained by the frequency analysis. That is, the first angle maximum peak intensity calculation circuit 114 executes the first angle maximum peak intensity calculation step S4 in FIG. 1, FIG. 23, or FIG. 25, specifically, steps S40 to S43 in FIG. 30. The first maximum peak intensity calculated by the first angle maximum peak intensity calculation circuit 114 is stored in the storage circuit 120. Further, the first angle maximum peak intensity calculation circuit 114 may execute frequency analysis on the time series data of the first angle obtained by replacing the data from the positive peak to the negative peak and the data from the negative peak to the positive peak with 0, and calculate, as the first maximum peak intensity, the maximum peak intensity included in the predetermined frequency band of the first frequency spectrum obtained by the frequency analysis.

Similarly, the second angle maximum peak intensity calculation circuit 115 executes, on the time series data of the second angle obtained by replacing the data from the positive peak to the negative peak and the data from the negative peak to the positive peak with 0, filter processing in which a predetermined frequency band is set as a pass band, executes frequency analysis on the time series data of the second angle subjected to filter processing, and calculates the second maximum peak intensity which is the maximum peak intensity in the second frequency spectrum obtained by the frequency analysis. That is, the second angle maximum peak intensity calculation circuit 115 executes the second angle maximum peak intensity calculation step S5 in FIG. 1, FIG. 23, or FIG. 25, specifically, steps S50 to S53 in FIG. 31. The second maximum peak intensity calculated by the second angle maximum peak intensity calculation circuit 115 is stored in the storage circuit 120. Further, the second angle maximum peak intensity calculation circuit 115 may execute frequency analysis on the time series data of the second angle obtained by replacing the data from the positive peak to the negative peak and the data from the negative peak to the positive peak with 0, and calculate, as the second maximum peak intensity, the maximum peak intensity included in a predetermined frequency band of the second frequency spectrum obtained by the frequency analysis.

Since other configurations of the signal processing device 100 according to the fifth embodiment are the same as those in any one of the first embodiment to the fourth embodiment, the description thereof will be omitted.

According to the signal processing method in the fifth embodiment described above, the same effects as those of the signal processing methods according to the first embodiment to the fourth embodiment can be attained. In addition, according to the signal processing method in the fifth embodiment, the signal processing device 100 can correctly calculate the first maximum peak intensity because a high-frequency component generated in a pseudo manner due to two pieces of discontinuous data included in the time series data of the first angle is reduced. Similarly, the signal processing device 100 can correctly calculate the second maximum peak intensity because a high-frequency component generated in a pseudo manner due to two pieces of discontinuous data included in the time series data of the second angle is reduced.

1-6. Sixth Embodiment

Hereinafter, in a sixth embodiment, the same components as those in any one of the first embodiment to the fifth embodiment are denoted by the same reference numerals, the same description as that of any one of the first embodiment to the fifth embodiment is omitted or simplified, and contents different from those of any one of the first embodiment to the fifth embodiment will be mainly described.

Figure 32:
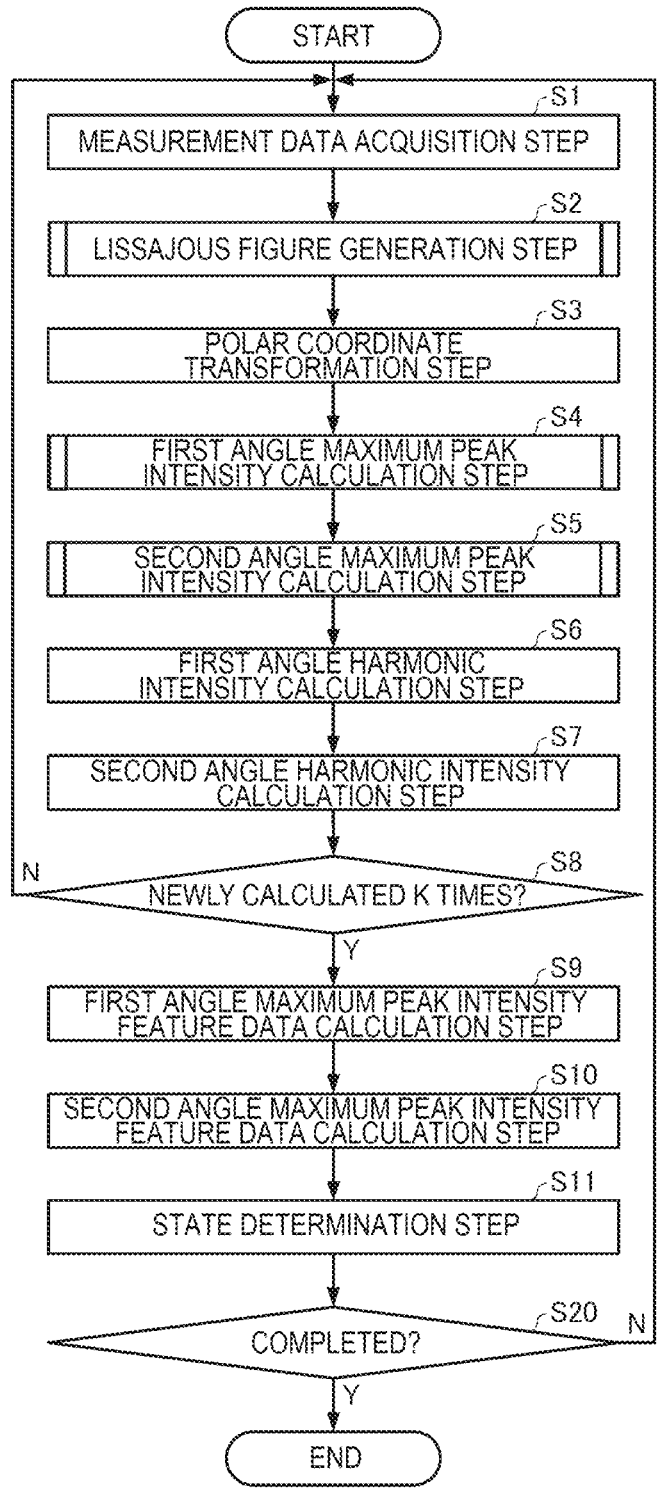
FIG. 32 is a flowchart showing a procedure of a signal processing method according to a sixth embodiment.

FIG. 32 is a flowchart showing a procedure of a signal processing method according to the sixth embodiment. As shown in FIG. 32, the signal processing method according to the sixth embodiment includes the measurement data acquisition step S1, the Lissajous figure generation step S2, the polar coordinate transformation step S3, the first angle maximum peak intensity calculation step S4, the second angle maximum peak intensity calculation step S5, the first angle harmonic intensity calculation step S6, the second angle harmonic intensity calculation step S7, the first angle maximum peak intensity feature data calculation step S9, the second angle maximum peak intensity feature data calculation step S10, and a state determination step S11. In the signal processing method according to the sixth embodiment, a part of the steps may be omitted or changed, or other steps may be added. The signal processing method according to the sixth embodiment is executed by, for example, the signal processing device 100. A configuration example of the signal processing device 100 that executes the signal processing method according to the sixth embodiment will be described later.

As shown in FIG. 32, as in the first embodiment to the fifth embodiment, the signal processing device 100 repeats the measurement data acquisition step S1, the Lissajous figure generation step S2, the polar coordinate transformation step S3, the first angle maximum peak intensity calculation step S4, and the second angle maximum peak intensity calculation step S5. Further, as in the third embodiment and the fourth embodiment, the signal processing device 100 repeats the first angle harmonic intensity calculation step S6 and the second angle harmonic intensity calculation step S7.

Then, when the first angle maximum peak intensity and the second angle maximum peak intensity are newly calculated K times in step S8, as in the fourth embodiment, the signal processing device 100 sequentially executes the first angle maximum peak intensity feature data calculation step S9 and the second angle maximum peak intensity feature data calculation step S10.

Next, in the state determination step S11, the signal processing device 100 determines a state of an object by an MT system based on a plurality of indexes indicating the state of the object. For example, the index indicating the state of the object is the first maximum peak intensity calculated in the first angle maximum peak intensity calculation step S4, the second maximum peak intensity calculated in the second angle maximum peak intensity calculation step S5, the total value of the intensities of the harmonics calculated in the first angle harmonic intensity calculation step S6, the total value of the intensities of the harmonics calculated in the second angle harmonic intensity calculation step S7, the average value and the variation that are calculated in the first angle maximum peak intensity feature data calculation step S9, or the average value and the variation that are calculated in the second angle maximum peak intensity feature data calculation step S10.

Then, until signal processing is completed (N in step S20), the signal processing device 100 repeats steps S1 to S11.

The MT system is a system of objectively determining whether the object changes from a predetermined state. In the MT system, a unit space x in a K-dimensional space having K indexes as axes is created in advance based on a measurement data group acquired when the object is in the predetermined state. Thereafter, a Mahalanobis distance with respect to the unit space x of the data including values of the K indexes calculated based on the newly acquired measurement data is calculated.

As shown in Equations (1) and (2), the unit space x is a data group that includes L pieces of data $x_1$ to $x_L$ each including the values of the K indexes and that is calculated based on a measurement data group acquired when the object is in the predetermined state. Each of K and L is an integer of 2 or more. In Equation (2), $x_l$ is l-th data forming the unit space x, and $x_{l1}$ to $x_{lK}$ are values of K indexes included in the data $x_l$.

$$x=(x_1, x_2, \ldots x_L) \tag{1}$$

$$x_l=(x_{l1}, x_{l2}, \ldots x_{lK})(l=1,2, \ldots L) \tag{2}$$

For each integer l of 1 or more and L or less, the value $x_{lK}$ of a k-th index included in the l-th data $x_l$ is normalized according to Equation (3), and a normalized value $X_{lk}$ is obtained.

$$X_{lk} = \frac{(x_{lk} - \mu_k)}{\sigma_k} \quad (k = 1, 2, \ldots K) \tag{3}$$

In Equation (3), $\mu_k$ is an average value of the values $x_{1k}$ to $x_{Lk}$ of the L k-th indexes included in the L pieces of data $x_1$ to $x_L$, and is calculated according to Equation (4).

$$\mu_k = \frac{1}{L}\sum_{l=1}^{L} x_{lk} \tag{4}$$

In Equation (3), $\sigma_k$ is a standard deviation of the values $x_{1k}$ to $x_{Lk}$ of the L k-th indexes included in the L pieces of data $x_1$ to $x_L$, and is calculated according to Equation (5).

$$\sigma_k = \sqrt{\frac{1}{L}\sum_{l=1}^{L} x_{lk}^2} \tag{5}$$

For each integer l of 1 or more and K or less, the l-th data $x_l$ represented by Equation (2) is normalized to data $X_l$ including normalized values $X_{l1}$ to $X_{lK}$ of K indexes, as represented by Equation (6).

$$x_l = (x_{l1}, x_{l2}, \ldots x_{lK})(l=1,2, \ldots L) \tag{6}$$

The unit space x represented by Equation (1) is normalized to a unit space X that is a data group including L pieces of normalized data $X_1$ to $X_L$, as represented by Equation (7).

$$X = (X_1, X_2, \ldots X_L) \tag{7}$$

According to Equations (8) and (9), a correlation matrix R relating to K indexes in the normalized unit space X is defined.

$$R = \begin{pmatrix} 1 & r_{12} & \cdots & r_{1K} \\ r_{21} & 1 & \cdots & r_{2K} \\ \vdots & \vdots & \ddots & \vdots \\ r_{K1} & r_{K2} & \cdots & 1 \end{pmatrix} \tag{8}$$

$$r_{ij} = \frac{\sum_{l=1}^{L} X_{li} \cdot X_{lj}}{\sqrt{\sum_{l=1}^{L} X_{li}^2} \cdot \sqrt{\sum_{l=1}^{L} X_{lj}^2}} \tag{9}$$

Thereafter, data y including values $y_1$ to $y_K$ of the K indexes represented by Equation (10) is calculated based on the newly acquired measurement data.

$$y = (y_1, y_2, \ldots y_K) \tag{10}$$

The value $y_k$ of the k-th index included in the data y is normalized according to Equation (11) using the average value $\mu_k$ and the standard deviation $\sigma_k$, and a normalized value $Y_k$ is obtained.

$$Y_k = \frac{(y_k - \mu_k)}{\sigma_k} \quad (k = 1, 2, \ldots K) \tag{11}$$

The data y represented by Equation (10) is normalized to data Y including normalized values $Y_1$ to $Y_K$ of the K indexes, as represented by Equation (12).

$$Y = (Y_1, Y_2, \ldots Y_K) \tag{12}$$

A Mahalanobis distance Mn of the data y with respect to the unit space x is calculated according to Equation (13) using the normalized data Y and an inverse matrix $R^{-1}$ of the correlation matrix R.

$$Mn = \sqrt{\frac{YR^{-1}Y^T}{K}} \tag{13}$$

The larger the Mahalanobis distance Mn is, the more distant the data y is from an average point of the unit space x, which means that similarity with a data group forming the unit space x is low. Therefore, when the Mahalanobis distance Mn is larger than a predetermined threshold value, it can be determined that the state of the object changes from the predetermined state. For example, when the predetermined state of the object is set to a normal mode and the Mahalanobis distance Mn is larger than the predetermined threshold value, it can be determined that the object changes to a state of the failure mode.

Figures 33, 34:
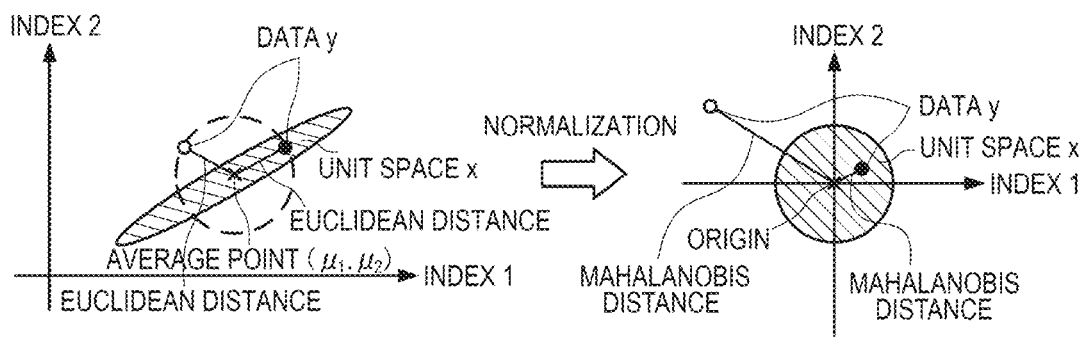
FIG. 33 is a diagram showing a concept of an MT system.
FIG. 34 is a diagram showing an example of unit space information.

FIG. 33 is a diagram showing a concept of the MT system in the case of K=2. In FIG. 33, although the data y indicated by a black circle and the data y indicated by a white circle have the same Euclidean distance with respect to an average point ($\mu_1$, $\mu_2$) of the unit space x, the former is inside the unit space x, whereas the latter is outside the unit space x. Therefore, the similarity of the data y to the data group forming the unit space x cannot be determined according to the Euclidean distance with respect to the average point ($\mu_1$, $\mu_2$) of the unit space x. The Mahalanobis distance Mn between the data y and the average point ($\mu_1$, $\mu_2$) of the unit space x corresponds to the Euclidean distance between an origin and the normalized data Y when the unit space x is normalized to the unit space X in which a distribution range is a circle centered on the origin. As shown in FIG. 33, an Euclidean distance between the origin and normalized data Y indicated by a white circle, that is, the Mahalanobis distance Mn between the data y indicated by the white circle and the average point ($\mu_1$, $\mu_2$) of the unit space x is larger than an Euclidean distance between the origin and normalized data Y indicated by a black circle, that is, the Mahalanobis distance Mn between the data y indicated by the black circle and the average point ($\mu_1$, $\mu_2$) of the unit space x. Therefore, the similarity of the data y to the data group forming the unit space x can be determined according to the Mahalanobis distance with respect to the average point ($\mu_1$, $\mu_2$) of the unit space x.

Before the operation of the signal processing device 100, a unit space information creation device (not shown) creates a unit space $x_{(1)}$ corresponding to the normal mode of the object and unit spaces $x_{(2)}$ to $x_{(N-1)}$ corresponding to first to N-th failure modes, and creates unit space information on the unit spaces $x_{(1)}$ to $x_{(N-1)}$. N is an integer of 2 or more. The unit space $x_{(1)}$ corresponds to the unit space x in Equation (1) when the object is in the normal mode. The unit spaces $x_{(2)}$ to $x_{(N-1)}$ correspond to the unit spaces x in Equation (1) when the object is in the first to N-th failure modes, respectively.

Specifically, the unit space information creation device creates the unit spaces $x_{(1)}$ to $x_{(N-1)}$ represented by Equation (1) described above, and calculates, for each unit space $x_{(j)}$, average values $\mu_{(j)1}$ to $\mu_{(j)K}$ and standard deviations $\sigma_{(j)1}$ to $\sigma_{(j)K}$ of the K indexes according to Equation (4) and Equation (5) described above. In addition, the unit space information creation device creates unit spaces $X_{(1)}$ to $X_{(N-1)}$ represented by Equation (7) described above, and calculates, for each unit space $X_{(j)}$, an inverse matrix $R_{(j)}^{-1}$ of a correlation matrix $R_{(j)}$ related to the K indexes that is represented by Equation (8) described above. Then, the unit space information creation device associates the normal mode, the average values $\mu_{(1)1}$ to $\mu_{(1)K}$, the standard deviations $\sigma_{(1)1}$ to $\sigma_{(1)K}$, and the inverse matrix $R_{(1)}^{-1}$ with one another, associates, for each integer i of 2 or more and N+1 or less, the i-th failure mode, the average values $\varphi_{(i+1)1}$ to $\varphi_{(i+1)K}$, the standard deviations $\sigma_{(i+1)1}$ to $\sigma_{(i+1)K}$, and the inverse matrix $R_{(i+1)}^{-1}$, and creates unit space information as shown in FIG. 34. The created unit space information is stored in the storage circuit 120 of the signal processing device 100.

Figure 35:
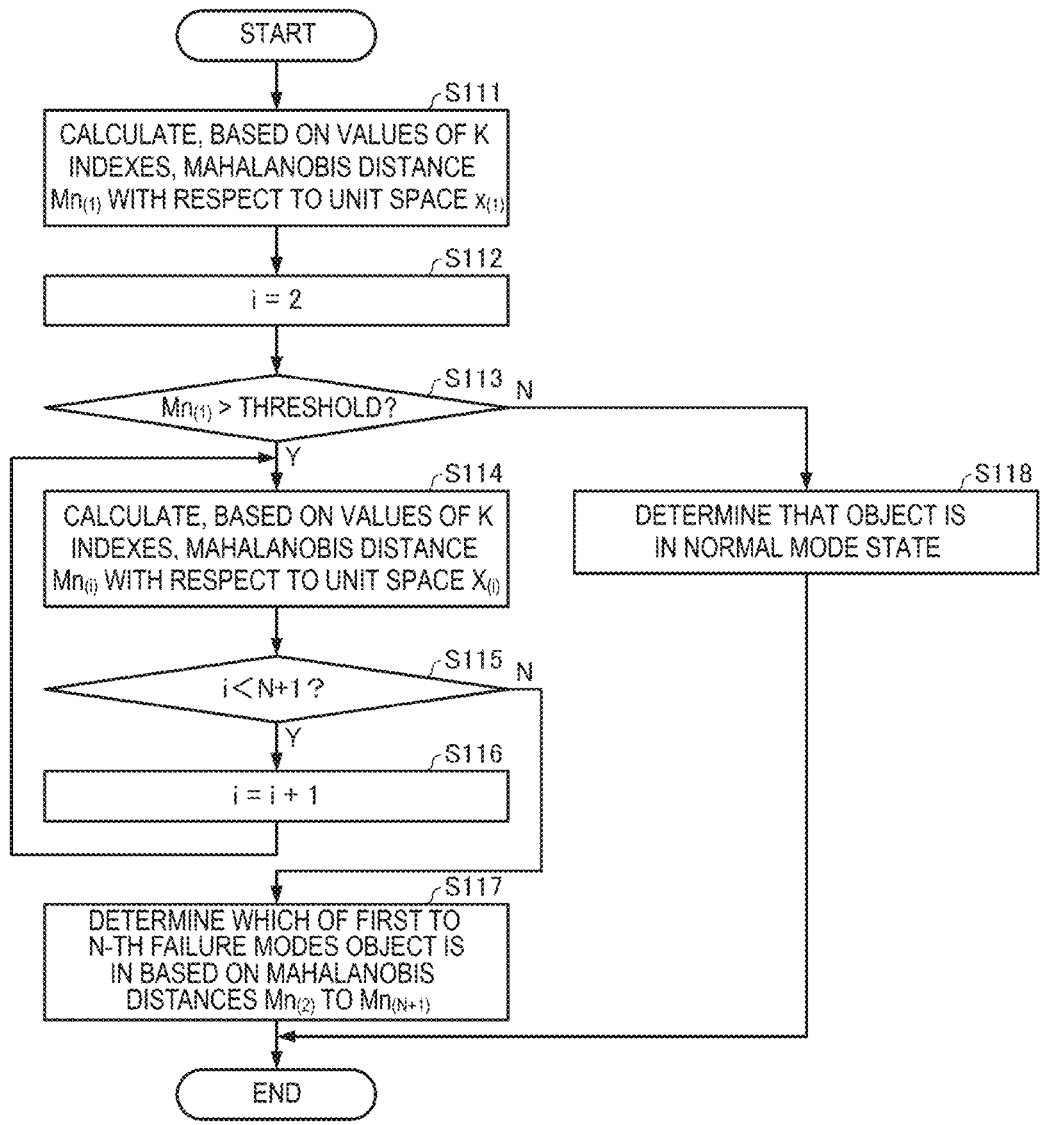
FIG. 35 is a flowchart showing an example of a procedure of a state determination step.

FIG. 35 is a flowchart showing an example of a procedure of the state determination step S11 in FIG. 32.

As shown in FIG. 35, first, in step S111, the signal processing device 100 calculates, based on the values of the K indexes, a Mahalanobis distance $Mn_{(1)}$ with respect to the unit space $x_{(1)}$ corresponding to the normal mode. K is an integer of 2 or more. The values of the K indexes are any K values among the first maximum peak intensity calculated in the first angle maximum peak intensity calculation step S4, the second maximum peak intensity calculated in the second angle maximum peak intensity calculation step S5, the total value of the intensities of the harmonics calculated in the first angle harmonic intensity calculation step S6, the total value of the intensities of the harmonics calculated in the second angle harmonic intensity calculation step S7, the average value and the variation that are calculated in the first angle maximum peak intensity feature data calculation step S9, and the average value and the variation that are calculated in the second angle maximum peak intensity feature data calculation step S10. Specifically, in step S111, the signal processing device 100 calculates data $y_{(1)}$ represented by Equation (10) described above, calculates data $Y_{(1)}$ represented by Equation (12) described above using the average values $\mu_{(1)1}$ to $\mu_{(1)K}$ and the standard deviations $\sigma_{(1)1}$ to $\sigma_{(1)K}$ of the K indexes of the unit space $x_{(1)}$ included in the unit space information, and calculates the Mahalanobis distance $Mn_{(1)}$ of the data $y_{(1)}$ with respect to the unit space $x_{(1)}$ according to Equation (13) described above using the data $Y_{(1)}$ and the inverse matrix $R_{(1)}^{-1}$ that is included in the unit space information.

Next, the signal processing device 100 sets the integer i to 2 in step S112, and determines, in step S113, whether the Mahalanobis distance $Mn_{(1)}$ exceeds the threshold value.

When the Mahalanobis distance $Mn_{(1)}$ does not exceed the threshold value, the signal processing device 100 determines, in step S118, that the object is in the normal mode state.

On the other hand, when the Mahalanobis distance $Mn_{(1)}$ exceeds the threshold value, the signal processing device 100 calculates, in step S114, a Mahalanobis distance $Mn_{(i+1)}$ with respect to a unit space $x_{(i+1)}$ corresponding to the i-th failure mode based on the values of the K indexes. Specifically, the signal processing device 100 calculates data $y_{(i+1)}$ represented by Equation (10) described above, calculates data $Y_{(i+1)}$ represented by Equation (12) described above using the average values $\mu_{(i+1)1}$ to $\mu_{(i+1)K}$ and the standard deviations $\sigma_{(i+1)1}$ to $\sigma_{(i+1)K}$ of the K indexes of the unit space $x_{(i+1)}$ included in the unit space information, and calculates the Mahalanobis distance $Mn_{(i+1)}$ of the data $y_{(i+1)}$ with respect to the unit space $x_{(i+1)}$ according to Equation (13) using the data $Y_{(i+1)}$ and the inverse matrix $R_{(i+1)}^{-1}$ that is included in the unit space information.

When the integer i is smaller than N+1 in step S115, the integer i is increased by 1 in step S116, and step S114 is executed. The signal processing device 100 repeats step S116 and step S114 until the integer i is N+1.

Figure 36:
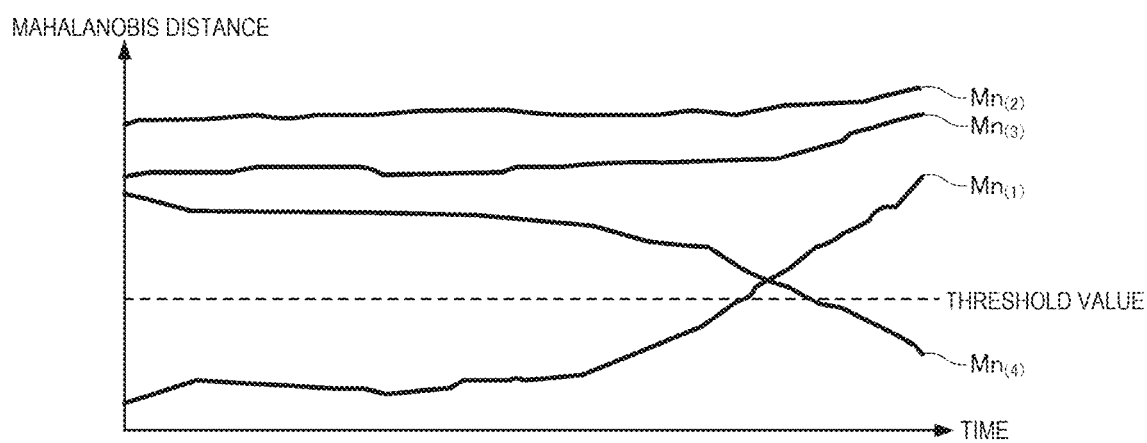
FIG. 36 is a diagram showing an example of a change in a Mahalanobis distance.

When the integer i coincides with N in step S115, the signal processing device 100 determines, in step S117, which of the first to N-th failure modes the object is in based on the Mahalanobis distances $Mn_{(2)}$ to $Mn_{(N-1)}$ calculated in step S114. For example, when the Mahalanobis distance $Mn_{(j+1)}$ is the minimum among the Mahalanobis distances $Mn_{(2)}$ to $Mn_{(N-1)}$, the signal processing device 100 may determine, in step S117, that the object is in the state of the j-th failure mode. In the example shown in FIG. 36, when the Mahalanobis distance $Mn_{(1)}$ exceeds the threshold value, since the Mahalanobis distance $Mn_{(4)}$ is the minimum among the Mahalanobis distances $Mn_{(2)}$ to $Mn_{(4)}$, the signal processing device 100 may determine that the object is in the state of the third failure mode.

Figure 37:
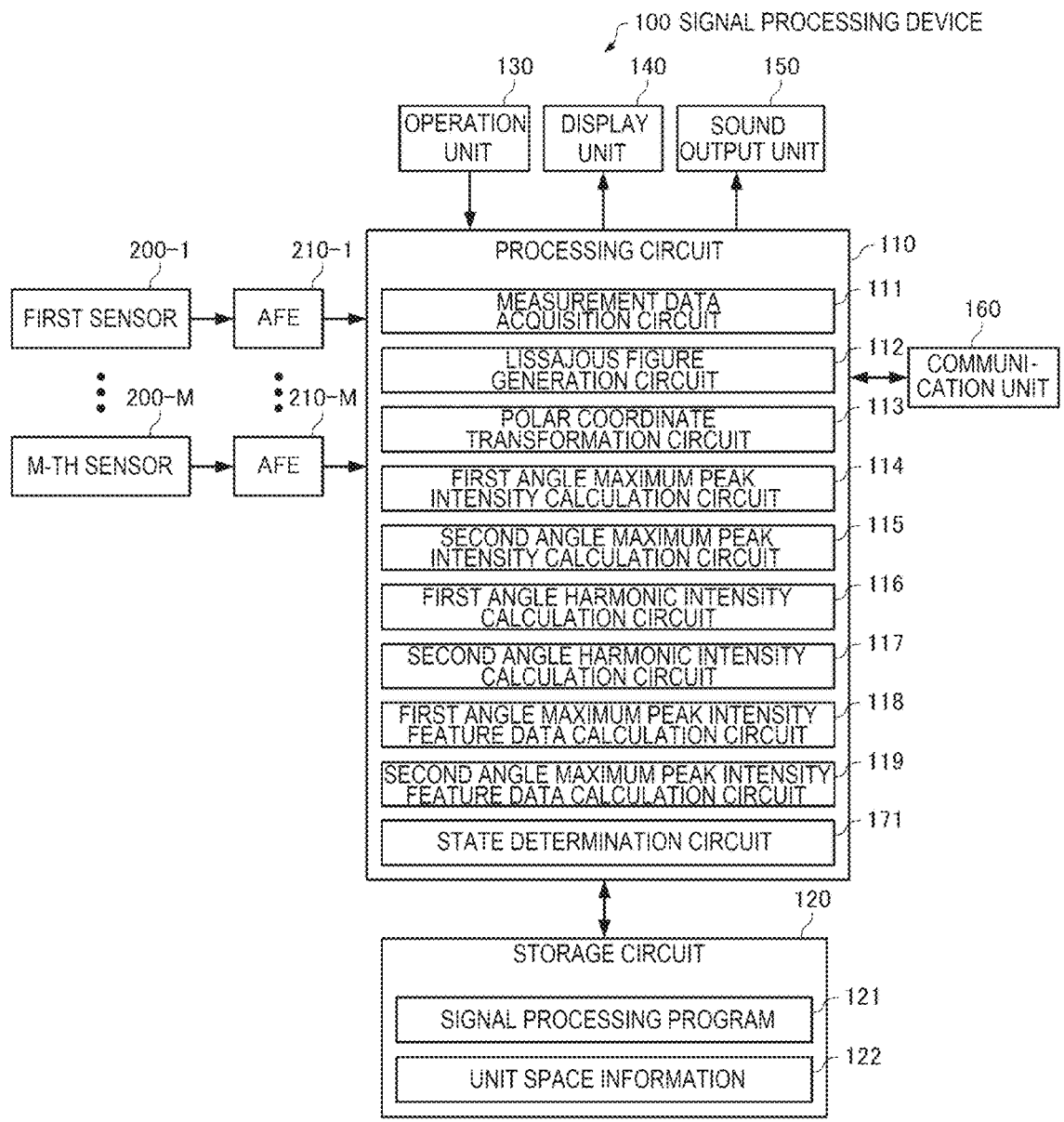
FIG. 37 is a diagram showing a configuration example of a signal processing device that executes the signal processing method according to the sixth embodiment.

FIG. 37 is a diagram showing a configuration example of the signal processing device 100 that executes the signal processing method according to the sixth embodiment. As shown in FIG. 37, the signal processing device 100 includes the first sensor 200-1 to the M-th sensor 200-M, the M analog front ends 210-1 to 210-M, the processing circuit 110, the storage circuit 120, the operation unit 130, the display unit 140, the sound output unit 150, and the communication unit 160. In the signal processing device 100, a part of the components in FIG. 37 may be omitted or changed, or other components may be added. For example, the first sensor 200-1 to the M-th sensor 200-M and the analog front ends 210-1 to 210-M may not be components of the signal processing device 100.

Since the configurations and the functions of the first sensor 200-1 to the M-th sensor 200-M, the analog front ends 210-1 to 210-M, the storage circuit 120, the operation unit 130, the display unit 140, the sound output unit 150, and the communication unit 160 are the same as those in any one of the first embodiment to the fifth embodiment, the description thereof will be omitted. In the sixth embodiment, unit space information 122 is stored in the storage circuit 120 in advance.

The processing circuit 110 executes the signal processing program 121 stored in the storage circuit 120, thereby functioning as the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, the second angle maximum peak intensity feature data calculation circuit 119, and a state determination circuit 171. That is, the signal processing device 100 includes the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, the second angle maximum peak intensity feature data calculation circuit 119, and the state determination circuit 171.

The measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, and the second angle maximum peak intensity feature data calculation circuit 119 execute the measurement data acquisition step S1, the Lissajous figure generation step S2, the polar coordinate transformation step S3, the first angle maximum peak intensity calculation step S4, the second angle maximum peak intensity calculation step S5, the first angle harmonic intensity calculation step S6, the second angle harmonic intensity calculation step S7, the first angle maximum peak intensity feature data calculation step S9, and the second angle maximum peak intensity feature data calculation step S10 in FIG. 32, respectively. Since the functions of the measurement data acquisition circuit 111, the Lissajous figure generation circuit 112, the polar coordinate transformation circuit 113, the first angle maximum peak intensity calculation circuit 114, and the second angle maximum peak intensity calculation circuit 115 are the same as those in any one of the first embodiment to the fifth embodiment, the description thereof will be omitted. In addition, since the functions of the first angular harmonic intensity calculation circuit 116 and the second angular harmonic intensity calculation circuit 117 are the same as those in the third embodiment or the fourth embodiment, the description thereof will be omitted. In addition, since the functions of the first angle maximum peak intensity feature data calculation circuit 118 and the second angle maximum peak intensity feature data calculation circuit 119 are the same as those in the fourth embodiment, the description thereof will be omitted.

The state determination circuit 171 determines the state of the object by the MT system based on the plurality of indexes representing the state of the object. For example, the indexes indicating the state of the object are the first maximum peak intensity calculated by the first angle maximum peak intensity calculation circuit 114, the second maximum peak intensity calculated by the second angle maximum peak intensity calculation circuit 115, the total value of the intensities of the harmonics calculated by the first angle harmonic intensity calculation circuit 116, the total value of the intensities of the harmonics calculated by the second angle harmonic intensity calculation circuit 117, the average value and the variation that are calculated by the first angle maximum peak intensity feature data calculation circuit 118, and the average value and the variation that are calculated by the second angle maximum peak intensity feature data calculation circuit 119. Specifically, the state determination circuit 171 refers to the unit space information 122, calculates the Mahalanobis distance $Mn_{(1)}$ with respect to the unit space $x_{(1)}$ corresponding to the normal mode based on the values of the K indexes, and determines that the object is in the state of the normal mode when the Mahalanobis distance $Mn_{(1)}$ does not exceed the threshold value. In addition, when the Mahalanobis distance $Mn_{(1)}$ exceeds the threshold value, the state determination circuit 171 refers to the unit space information 122, calculates the Mahalanobis distances $Mn_{(2)}$ to $Mn_{(N-1)}$ with respect to the unit spaces $x_{(2)}$ to $x_{(N-1)}$ corresponding to the first to N-th failure modes based on the values of the K indexes, and determines which of the first to N-th failure modes the object is in based on the Mahalanobis distances $Mn_{(2)}$ to $Mn_{(N-1)}$. That is, the state determination circuit 171 executes the state determination step S11 in FIG. 32, specifically, steps S111 to S118 in FIG. 35. A determination result of the state determination circuit 171 is stored in the storage circuit 120.

The display unit 140 may display a screen including the determination result of the state determination circuit 171 based on the display signal output from the processing circuit 110.

The communication unit 160 may transmit information including the determination result of the state determination circuit 171 to an external device, and the external device may display at least a part of the received information on a display unit (not shown).

At least a part of the measurement data acquisition circuit 111, the Lissajous figure generation circuit 112, the polar coordinate transformation circuit 113, the first angle maximum peak intensity calculation circuit 114, the second angle maximum peak intensity calculation circuit 115, the first angle harmonic intensity calculation circuit 116, the second angle harmonic intensity calculation circuit 117, the first angle maximum peak intensity feature data calculation circuit 118, the second angle maximum peak intensity feature data calculation circuit 119, and the state determination circuit 171 may be implemented by dedicated hardware.

According to the signal processing method in the sixth embodiment described above, the same effects as those of the signal processing methods according to the first embodiment to the fifth embodiment can be attained. In addition, according to the signal processing method in the sixth embodiment, since the signal processing device 100 can determine the state of the object using, as one index, the Mahalanobis distance calculated based on the plurality of indexes indicating the state of the object, versatility is improved.

2. Monitoring System

Hereinafter, in a monitoring system according to the present embodiment, the same components as those described in any of the above embodiments are denoted by the same reference numerals, the same description as that of any of the above embodiments is omitted or simplified, and contents different from those of any of the above embodiments will be mainly described.

Figure 38:
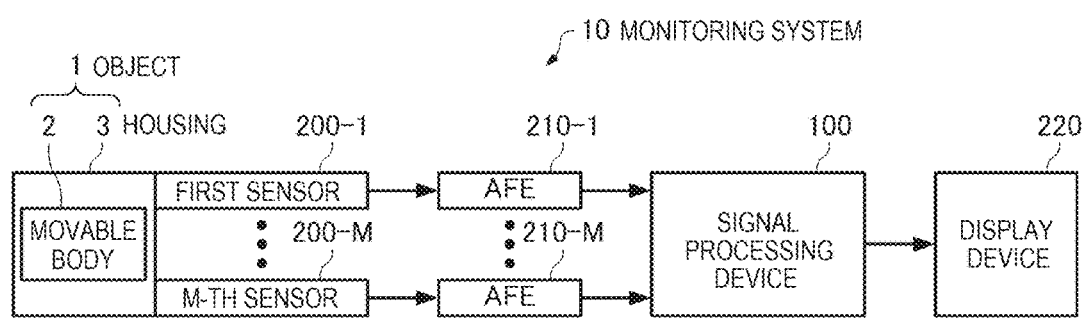
FIG. 38 is a diagram showing a configuration example of a monitoring system according to the present embodiment.

FIG. 38 is a diagram showing a configuration example of the monitoring system according to the present embodiment. As shown in FIG. 38, a monitoring system 10 according to the present embodiment includes the first sensor 200-1 to the M-th sensor 200-M, the M analog front ends 210-1 to 210-M, the signal processing device 100, and a display device 220, and monitors the state of an object 1.

The object 1 includes a movable body 2 and a housing 3 that houses the movable body 2. Each of the first sensor 200-1 to the M-th sensor 200-M is attached to the housing 3, detects a physical quantity generated by a vibration of the object 1, and outputs a signal having a magnitude corresponding to the detected physical quantity. The output signals of the first sensor 200-1 to the M-th sensor 200-M are input to the analog front ends 210-1 to 210-M, respectively.

The analog front ends 210-1 to 210-M execute amplification processing, A/D transformation processing, and the like on the output signals of the first sensor 200-1 to the M-th sensor 200-M, respectively, and output digital time-series signals.

The signal processing device 100 acquires the M digital time-series signals output from the analog front ends 210-1 to 210-M as the first measurement data $D_1$ to the M-th measurement data $D_M$, generates a Lissajous figure, generates various types of information based on the generated Lissajous figure, and displays at least a part of the various types of information on the display device 220. The display device 220 may be a device separate from the signal processing device 100, or may be a display unit provided in the signal processing device 100. When the first sensor 200-1 to the M-th sensor 200-M output the digital time-series signals, the signal processing device 100 may acquire the M digital time-series signals as the first measurement data $D_1$ to the M-th measurement data $D_M$. Therefore, the analog front ends 210-1 to 210-M may be omitted. As the signal processing device 100, for example, any signal processing device 100 according to the first embodiment to the sixth embodiment described above can be applied.

Figure 39:
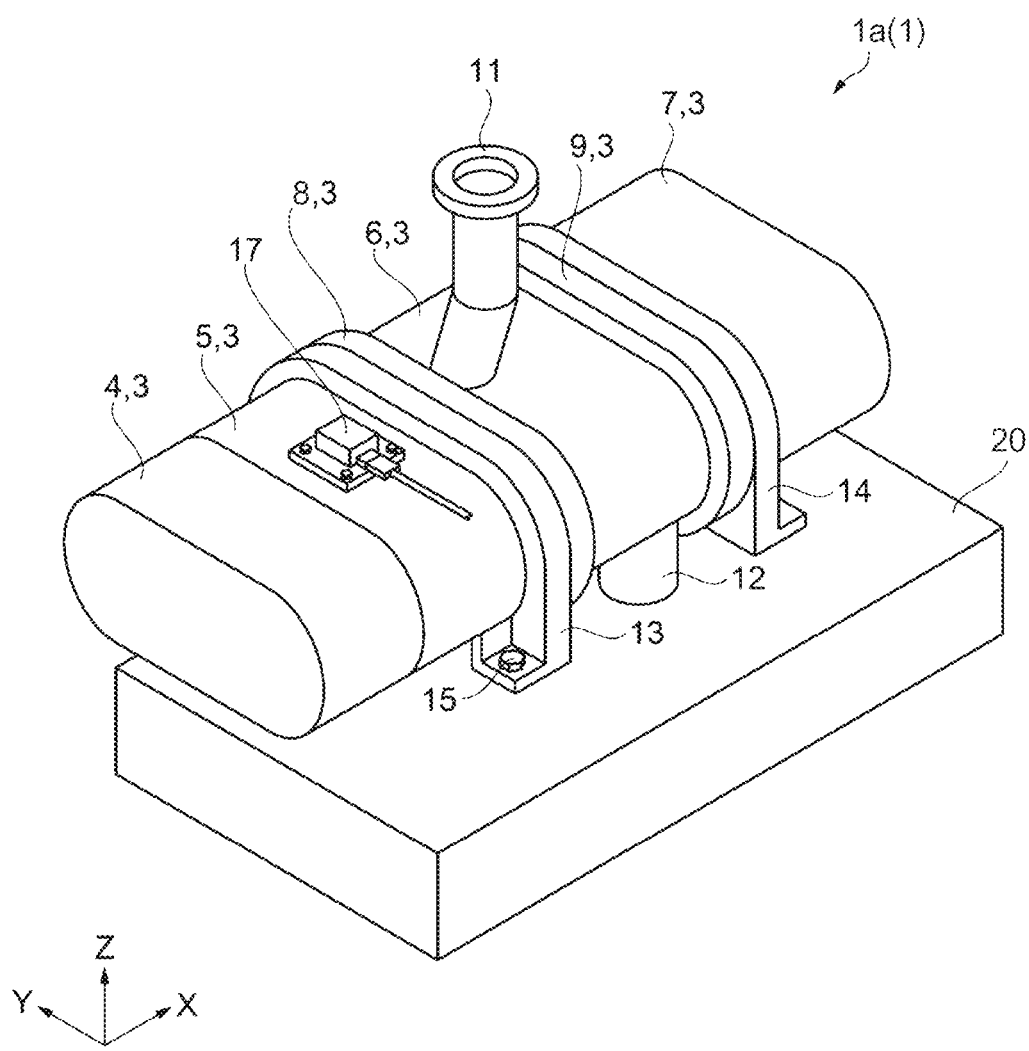
FIG. 39 is a schematic perspective view showing a configuration of a vacuum pump.

FIG. 39 shows a vacuum pump 1a which is an example of the object 1. As shown in FIG. 39, the vacuum pump 1a is disposed on a base 20. The vacuum pump 1a has a columnar shape having a cross section of a substantially elongated circle. A longitudinal direction of the vacuum pump 1a is defined as an X direction. A long axis direction of the elongated circle is defined as a Y direction, and a short axis direction of the elongated circle is defined as a Z direction.

The vacuum pump 1a includes the housing 3. The housing 3 includes a motor case 4, a coupling portion 5, a pump case 6, and a gear case 7 that are arranged from a −X direction side toward a +X direction side. The housing 3 includes a first side wall 8 as a bearing casing between the coupling portion 5 and the pump case 6. The housing 3 includes a second side wall 9 between the pump case 6 and the gear case 7.

An intake pipe 11 is coupled to the pump case 6 on a surface on a +Z direction side. An exhaust pipe 12 is coupled to the pump case 6 on a surface on a −Z direction side.

The coupling portion 5 includes, on a base 20 side, a first leg portion 13 and a second leg portion. The first leg portion 13 is disposed on a −Y direction side, and the second leg portion is disposed on a +Y direction side. The gear case 7 includes, on the base 20 side, a third leg portion 14 and a fourth leg portion. The third leg portion 14 is disposed on the −Y direction side, and the fourth leg portion is disposed on the +Y direction side. The first leg portion 13 to the fourth leg portion are fastened to the base 20 by a first bolt 15.

A sensor unit 17 is attached to the housing 3. The sensor unit 17 is attached to, for example, the coupling portion 5. The sensor unit 17 includes the first sensor 200-1 to the M-th sensor 200-M (not shown) therein. For example, the first sensor 200-1 may be a velocity sensor that detects a velocity in an X-axis direction, the second sensor 200-2 may be a velocity sensor that detects a velocity in a Y-axis direction, and the third sensor 200-3 may be a velocity sensor that detects a velocity in a Z-axis direction.

Figure 40:
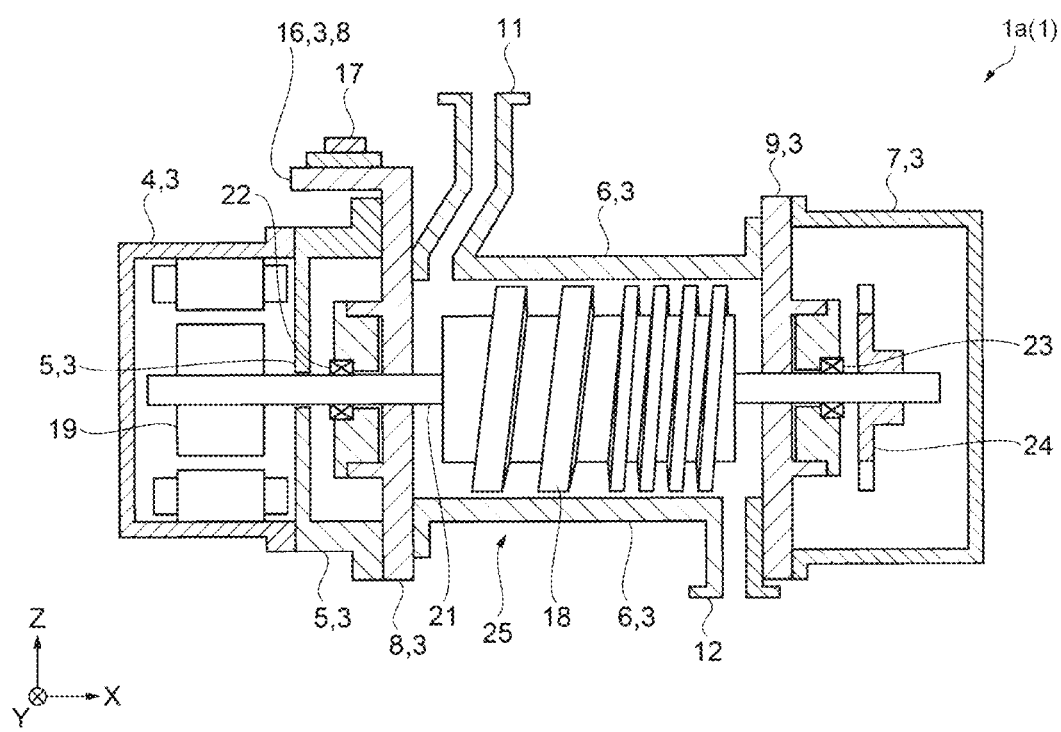
FIG. 40 is a schematic side sectional view showing an internal structure of the vacuum pump.
Figure 41:
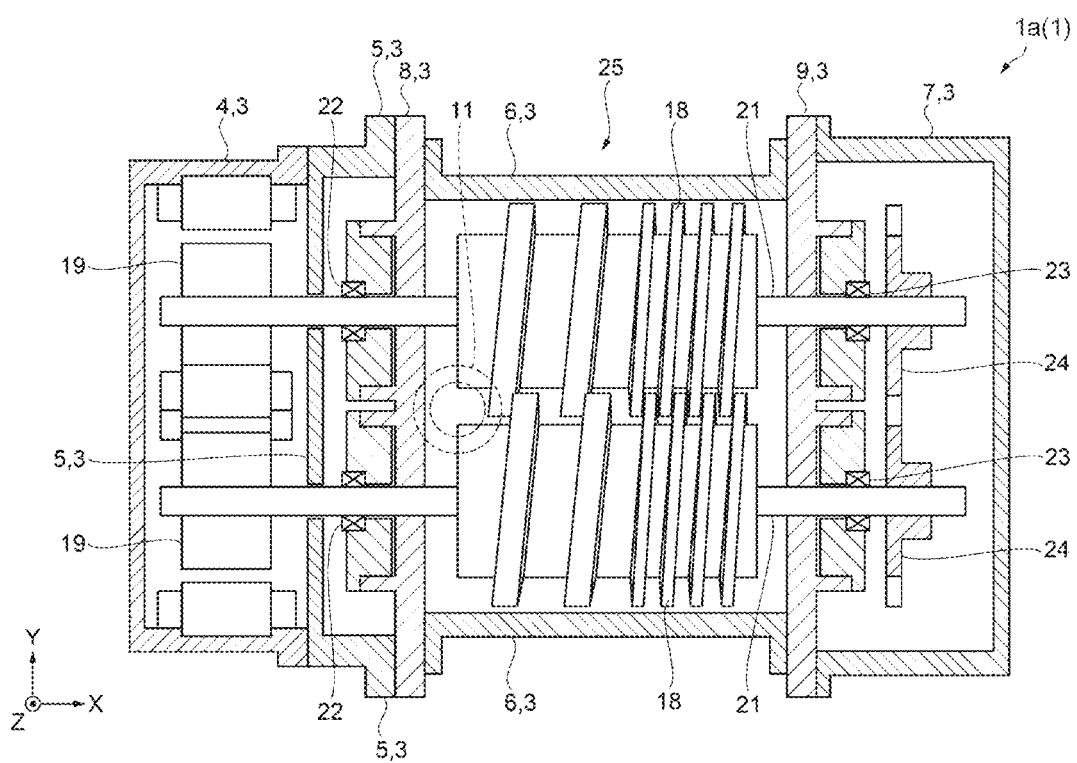
FIG. 41 is a schematic plan sectional view showing the internal structure of the vacuum pump.

An internal structure of the vacuum pump 1a will be described with reference to FIGS. 40 and 41. FIG. 40 is a diagram viewed from the −Y direction. FIG. 41 is a diagram viewed from the +Z direction. In the drawings, the first leg portion 13 to the fourth leg portion are omitted. The vacuum pump 1a includes two pump rotors 18 serving as the movable body 2 that transfer gas, and two motors 19 that rotate the two pump rotors 18. The housing 3 houses the pump rotors 18.

The two pump rotors 18 include two rotation shafts 21. The two rotation shafts 21 are each rotatably supported by a respective one of a first bearing 22 and a second bearing 23 serving as bearings. The two motors 19 are each coupled to a respective one of one ends of the rotation shafts 21. The motors 19 synchronously rotate the two pump rotors 18 in directions opposite to each other. Two timing gears 24 are each fixed to a respective one of the other ends of the rotation shafts 21. The timing gears 24 are provided to ensure the synchronous rotation of the two pump rotors 18 when the synchronous rotation of the two motors 19 is lost.

The pump case 6 is sandwiched between the first side wall 8 and the second side wall 9. The pump rotors 18 are disposed in a pump chamber 25 including the pump case 6, the first side wall 8, and the second side wall 9.

The first side wall 8 supports the first bearing 22 on the intake pipe 11 side. The first bearing 22 is disposed in the coupling portion 5. The motor 19 is disposed in the motor case 4 fixed to the coupling portion 5. The second bearing 23 on an exhaust pipe 12 side is fixed to the second side wall 9. The timing gears 24 and the second bearing 23 are disposed in the gear case 7. The rotation of the pump rotors 18 causes the first bearing 22 and the second bearing 23 to vibrate. The vibrations of the first bearing 22 and the second bearing 23 are transmitted to the housing 3 such as the coupling portion 5 via the first side wall 8 and the second side wall 9. The first sensor 200-1 to the M-th sensor 200-M that are provided in the sensor unit 17 detect the vibration transmitted to the housing 3.

According to the monitoring system 10 in the present embodiment, the signal processing device 100 can calculate, based on the first measurement data $D_1$ to the M-th measurement data $D_M$ based on the signals output from the first sensor 200-1 to the M-th sensor 200-M, an index for easily determining the state of the object. Therefore, a user can monitor the state of the object based on the index calculated by the signal processing device 100, and accurately determine presence or absence of an abnormality in the object.

3. Modifications

The present disclosure is not limited to the present embodiment, and various modifications can be made within the scope of the gist of the present disclosure.

For example, in the above embodiments, in the Lissajous figure generation step S2, the signal processing device 100 generates a Lissajous figure in which the i-th averaged data string $D_{AVGi}$ is assigned to the i-th axis. More simply, the signal processing device 100 may generate a Lissajous figure in which the i-th measurement data $D_i$ is assigned to the i-th axis.

For example, in the sixth embodiment, when the Mahalanobis distance $Mn_{(1)}$ with respect to the unit space $x_{(1)}$ corresponding to the normal mode exceeds the threshold value, the signal processing device 100 determines which of the first to N-th failure modes the object is in. More simply, the signal processing device 100 may only determine that the object fails.

The above embodiments and modifications are merely examples, and the present disclosure is not limited thereto. For example, the embodiments and the modifications may be combined as appropriate.

The present disclosure includes a configuration substantially the same as the configurations described in the embodiments, for example, a configuration having the same functions, methods, and results, or a configuration having the same objects and effects. In addition, the present disclosure includes a configuration in which an unessential portion of the configurations described in the embodiments is replaced. In addition, the present disclosure includes a configuration having the same function and effect as the configurations described in the embodiments or a configuration capable of achieving the same object as the configurations described in the embodiments. In addition, the present disclosure includes a configuration in which a known technique is added to the configurations described in the embodiments.

The following contents are derived from the above embodiments and modifications.

An aspect of the signal processing method includes: a measurement data acquisition step of acquiring first measurement data based on a signal output from a first sensor configured to detect a physical quantity of a first axis generated by a vibration of an object and second measurement data based on a signal output from a second sensor configured to detect a physical quantity of a second axis generated by the vibration of the object; a Lissajous figure generation step of generating a Lissajous figure based on the first measurement data and the second measurement data; a polar coordinate transformation step of transforming coordinates of each point in the Lissajous figure into polar coordinates and generating time series data of a first angle which is an angle formed between the first axis and a straight line, the straight line being obtained by projecting a straight line passing through an origin and each point in the Lissajous figure onto a plane including the first axis and the second axis; and a first angle maximum peak intensity calculation step of executing frequency analysis on the time series data of the first angle and calculating a first maximum peak intensity which is a maximum peak intensity in a first frequency spectrum obtained by the frequency analysis.

In the signal processing method, when the vibration of the object is constituted by a continuous rotational movement, if each point in the Lissajous figure is represented by polar coordinates, the difference in stability of the vibration appears significantly at the first angle. Therefore, the first maximum peak intensity which is the maximum peak intensity in the first frequency spectrum obtained by the frequency analysis on the time series data of the first angle is correlated with symmetry and smoothness of the rotational movement of the vibration, and thus is an index indicating the state of the object. Further, a user or a signal processing device can easily determine the state of the object by comparing the first maximum peak intensity with a threshold value. Therefore, according to the signal processing method, an index for easily determining the state of the object can be calculated based on the physical quantity generated by the vibration of the object.

According to the signal processing method, since the first angle is a dimensionless value, the first maximum peak intensity is constant regardless of characteristics and an installation place of the object, and the threshold value for determining the state of the object can also be constant.

In an aspect of the signal processing method, in the first angle maximum peak intensity calculation step, the first maximum peak intensity may be calculated only in a predetermined frequency band.

According to the signal processing method, since a peak intensity of a frequency component to which attention is to be paid can be calculated as the first maximum peak intensity even when intensities of a noise component and an unnecessary frequency component are large in the time series data of the first angle, an index by which the state of the object is more indicated can be obtained.

An aspect of the signal processing method may further include a first angle harmonic intensity calculation step of calculating, based on the first frequency spectrum, a total value of intensities of harmonics having frequencies of an even multiple of a fundamental wave of the vibration and a total value of intensities of harmonics having frequencies of an odd multiple of the fundamental wave.

According to the signal processing method, the higher the symmetry of the vibration of the object is, the larger the total value of the intensities of the odd-order harmonics in the first frequency spectrum is, and the lower the symmetry of the vibration of the object is, the larger the total value of the intensities of the even-order harmonics in the first frequency spectrum is. Therefore, an index effective for determining the symmetry of the vibration can be obtained.

In an aspect of the signal processing method, in the first angle maximum peak intensity calculation step, time series data of the first maximum peak intensity may be generated.

According to the signal processing method, the user or the signal processing device can observe a temporal change in the first maximum peak intensity.

An aspect of the signal processing method may further include a first angle maximum peak intensity feature data calculation step of calculating at least one of an average value and a variation of the time series data of the first maximum peak intensity.

According to the signal processing method, by calculating the average value of the time series data of the first maximum peak intensity, a more accurate index can be obtained in which an influence of a sudden state change of the object or a variation of a measurement error is reduced. In addition, by calculating the variation of the time series data of the first maximum peak intensity, an index can be obtained with which a periodic fluctuation or a sudden state change of the vibration state of the object can be captured.

In an aspect of the signal processing method, in the first angle maximum peak intensity calculation step, a range of the first angle may be set to $-\pi$ or more and $+\pi$ or less, and when one of two pieces of consecutive data included in the time series data of the first angle is a positive peak and the other is a negative peak, the two data may be replaced with 0 to execute the frequency analysis.

According to the signal processing method, since the high-frequency component generated in a pseudo manner due to two pieces of discontinuous data included in the time series data of the first angle is reduced, the first maximum peak intensity can be correctly calculated.

In an aspect of the signal processing method, in the measurement data acquisition step, the first measurement data, the second measurement data, and third measurement data based on a signal output from a third sensor configured to detect a physical quantity of a third axis generated by the vibration of the object are acquired, in the Lissajous figure generation step, the Lissajous figure is generated based on the first measurement data, the second measurement data, and the third measurement data, and in the polar coordinate transformation step, coordinates of each point in the Lissajous figure are transformed into polar coordinates, and time series data of the first angle and time series data of a second angle which is an angle formed between the third axis and a straight line passing through the origin and each point in the Lissajous figure are generated. The signal processing method may further include a second angle maximum peak intensity calculation step of executing frequency analysis on the time series data of the second angle and calculating a second maximum peak intensity which is a maximum peak intensity in a second frequency spectrum obtained by the frequency analysis.

In the signal processing method, when the vibration of the object is constituted by a continuous rotational movement, if each point in the Lissajous figure is represented by polar coordinates, the difference in stability of the vibration appears significantly at the second angle. Therefore, the second maximum peak intensity which is the maximum peak intensity in the second frequency spectrum obtained by the frequency analysis on the time series data of the second angle is correlated with the symmetry and smoothness of the rotational movement of the vibration, and thus is an index indicating the state of the object. Further, the user or the signal processing device can easily determine the state of the object by comparing the second maximum peak intensity with the threshold value. Therefore, according to the signal processing method, an index for easily determining the state of the object can be calculated based on the physical quantity generated by the vibration of the object.

According to the signal processing method, since the second angle is a dimensionless value, the second maximum peak intensity is constant regardless of the characteristics and the installation place of the object, and the threshold value for determining the state of the object can also be constant.

An aspect of the signal processing method may further include a state determination step of determining the state of the object by an MT system based on a plurality of indexes indicating the state of the object.

According to the signal processing method, since the state of the object can be determined using, as one index, a Mahalanobis distance calculated based on the plurality of indexes indicating the state of the object, versatility is improved.

An aspect of the signal processing device includes: a measurement data acquisition circuit configured to acquire first measurement data based on a signal output from a first sensor configured to detect a physical quantity of a first axis generated by a vibration of an object and second measurement data based on a signal output from a second sensor configured to detect a physical quantity of a second axis generated by the vibration of the object; a Lissajous figure generation circuit configured to generate a Lissajous figure based on the first measurement data and the second measurement data; a polar coordinate transformation circuit configured to transform coordinates of each point in the Lissajous figure into polar coordinates, and generate time series data of a first angle which is an angle formed between the first axis and a straight line, the straight line being obtained by projecting a straight line passing through an origin and each point in the Lissajous figure onto a plane including the first axis and the second axis; and a first angle maximum peak intensity calculation circuit configured to execute frequency analysis on the time series data of the first angle and calculate a first maximum peak intensity which is a maximum peak intensity in a first frequency spectrum obtained by the frequency analysis.

In the signal processing device, when the vibration of the object is constituted by a continuous rotational movement, if each point in the Lissajous figure is represented by polar coordinates, the difference in stability of the vibration appears remarkably at the first angle. Therefore, the first maximum peak intensity which is the maximum peak intensity in the first frequency spectrum obtained by the frequency analysis on the time series data of the first angle is correlated with symmetry and smoothness of the rotational movement of the vibration, and thus is an index indicating the state of the object. Further, the user or the signal processing device can easily determine the state of the object by comparing the first maximum peak intensity with a threshold value. Therefore, according to the signal processing device, an index for easily determining the state of the object can be calculated based on the physical quantity generated by the vibration of the object.

According to the signal processing device, since the first angle is a dimensionless value, the first maximum peak intensity is constant regardless of the characteristics and the installation place of the object, and the threshold value for determining the state of the object can also be constant.

An aspect of a monitoring system is a monitoring system configured to monitor a state of an object. The monitoring system includes: an aspect of the signal processing device; the first sensor; and the second sensor. The object includes a movable body and a housing configured to house the movable body. The first sensor and the second sensor are attached to the housing.

According to the monitoring system, the signal processing device can calculate an index for easily determining the state of the object based on the physical quantity generated by the vibration of the object. Therefore, the user can monitor the state of the object based on the index calculated by the signal processing device, and can accurately determine presence or absence of an abnormality in the object.

What is claimed is:

1. A signal processing method for causing a processor to execute a process, the signal processing method comprising:
    a sensor placement step of mounting a first sensor and a second sensor on an object including a motor, the first sensor and the second sensor being configured to detect a first acceleration of a first axis and a second acceleration of a second axis generated by a vibration of the object, respectively; and
    executing on the processor the steps of:
    a measurement data acquisition step of acquiring first measurement data based on a signal output from the first sensor and second measurement data based on a signal output from the second sensor;
    a Lissajous figure generation step of generating a Lissajous figure based on the first measurement data and the second measurement data;
    a polar coordinate transformation step of transforming coordinates of each point in the Lissajous figure into polar coordinates and generating time series data of a first angle which is an angle formed between the first axis and a straight line, the straight line being obtained by projecting a straight line passing through an origin and each point in the Lissajous figure onto a plane including the first axis and the second axis;
    a first angle maximum peak intensity calculation step of executing frequency analysis on the time series data of the first angle and calculating a first maximum peak intensity which is a maximum peak intensity in a first frequency spectrum obtained by the frequency analysis; and
    a state determination step of determining whether the object is operating abnormally by comparing the first maximum peak intensity with a first threshold value.

2. The signal processing method according to claim 1, wherein
    in the first angle maximum peak intensity calculation step, the first maximum peak intensity is calculated only in a predetermined frequency band.

3. The signal processing method according to claim 1, further comprising
    a first angle harmonic intensity calculation step of calculating, based on the first frequency spectrum, a total value of intensities of harmonics having frequencies of an even multiple of a fundamental wave of the vibration and a total value of intensities of harmonics having frequencies of an odd multiple of the fundamental wave.

4. The signal processing method according to claim 1, wherein
in the first angle maximum peak intensity calculation step, time series data of the first maximum peak intensity is generated.

5. The signal processing method according to claim 4, further comprising
a first angle maximum peak intensity feature data calculation step of calculating at least one of an average value and a variation of the time series data of the first maximum peak intensity.

6. The signal processing method according to claim 1, wherein
in the first angle maximum peak intensity calculation step, a range of the first angle is set to $-\pi$ or more and $+\pi$ or less, and when one of two pieces of consecutive data included in the time series data of the first angle is a positive peak and the other is a negative peak, the two pieces of data are replaced with 0 to execute the frequency analysis.

7. The signal processing method according to claim 1, further comprising:
mounting a third sensor on the object, the third sensor being configured to detect a third acceleration of a third axis generated by the vibration of the object, wherein
in the measurement data acquisition step, the first measurement data, the second measurement data, and third measurement data based on a signal output from the third sensor configured to detect a third acceleration of a third axis generated by the vibration of the object are acquired,
in the Lissajous figure generation step, the Lissajous figure is generated based on the first measurement data, the second measurement data, and the third measurement data, and
in the polar coordinate transformation step, coordinates of each point in the Lissajous figure are transformed into polar coordinates, and the time series data of the first angle and time series data of a second angle which is an angle formed between the third axis and a straight line passing through the origin and each point in the Lissajous figure are generated,
the signal processing method further comprising
a second angle maximum peak intensity calculation step of executing frequency analysis on the time series data of the second angle and calculating a second maximum peak intensity which is a maximum peak intensity in a second frequency spectrum obtained by the frequency analysis.

8. The signal processing method according to claim 1, further comprising
a state determination step of determining a state of the object by an MT system based on a plurality of indexes indicating the state of the object.

9. A signal processing device comprising:
a measurement data acquisition circuit configured to acquire first measurement data based on a signal output from a first sensor, which is mounted on an object including a motor, configured to detect a first acceleration of a first axis generated by a vibration of the object including the motor and second measurement data based on a signal output from a second sensor, which is mounted on the object, configured to detect a second acceleration of a second axis generated by the vibration of the object;
a Lissajous figure generation circuit configured to generate a Lissajous figure based on the first measurement data and the second measurement data;
a polar coordinate transformation circuit configured to transform coordinates of each point in the Lissajous figure into polar coordinates, and generate time series data of a first angle which is an angle formed between the first axis and a straight line, the straight line being obtained by projecting a straight line passing through an origin and each point in the Lissajous figure onto a plane including the first axis and the second axis;
a first angle maximum peak intensity calculation circuit configured to execute frequency analysis on the time series data of the first angle and calculate a first maximum peak intensity which is a maximum peak intensity in a first frequency spectrum obtained by the frequency analysis; and
a state determination circuit configured to determine whether the object is operating abnormally by comparing the first maximum peak intensity with a first threshold value.

10. A monitoring system comprising:
the signal processing device according to claim 9;
the first sensor; and
the second sensor, wherein
the monitoring system is configured to monitor a state of the object,
the object is configured with a movable body and a housing configured to house the movable body, and
the first sensor and the second sensor are attached to the housing.

* * * * *